US007509274B2

(12) United States Patent
Kam et al.

(10) Patent No.: US 7,509,274 B2
(45) Date of Patent: Mar. 24, 2009

(54) INTERNET-BASED SYSTEM FOR IDENTIFICATION, MEASUREMENT AND RANKING OF INVESTMENT PORTFOLIO MANAGEMENT, AND OPERATION OF A FUND SUPERMARKET, INCLUDING "BEST INVESTOR" MANAGED FUNDS

(76) Inventors: Kendrick W. Kam, 26888 Almaden Ct., Los Altos, CA (US) 94022; Bruce L. Horn, 207 Ridgecrest Dr., Mammoth Lakes, CA (US) 93546-1692

( * ) Notice: Subject to any disclaimer, the term of this patent is extended or adjusted under 35 U.S.C. 154(b) by 1540 days.

(21) Appl. No.: 09/836,694

(22) Filed: Apr. 17, 2001

(65) Prior Publication Data
US 2001/0042037 A1    Nov. 15, 2001

Related U.S. Application Data

(60) Provisional application No. 60/197,569, filed on Apr. 17, 2000, provisional application No. 60/231,058, filed on Sep. 8, 2000, provisional application No. 60/261,885, filed on Jan. 16, 2001.

(51) Int. Cl.
*G06Q 40/00* (2006.01)
(52) U.S. Cl. .................. 705/35; 705/36 R; 705/37; 463/10; 463/25; 708/131; 708/132; 708/134
(58) Field of Classification Search ............. 705/35–45, 705/26; 395/236; 463/1–47; 708/131–132, 708/134
See application file for complete search history.

(56) References Cited

U.S. PATENT DOCUMENTS 4,554,418 A    11/1985    Toy ........................... 179/2 DP (Continued)

FOREIGN PATENT DOCUMENTS

WO    WO 99/15950    4/1999

OTHER PUBLICATIONS

William Sharpe, Asset Allocation: Management Style and Performance Measurement, Winter 1992, pp. 7-19).*
William Sharpe, Assett Allocation: Management Style and Performance Measurement, Journal of Portfolio Management, Winter 1992, www.uic.edu/classes/fin/fin412/articles/sharpe.pdf.*

(Continued)

*Primary Examiner*—Mary Cheung
*Assistant Examiner*—Brian Fertig
(74) *Attorney, Agent, or Firm*—Jacques M. Dulin, Esq.; Innovation Law Group, Ltd.

(57) ABSTRACT

Internet-based business system and management programs therefor, and more particularly to financial investment management characterized by a unique system of attracting and identifying the Best Investors, including offering, facilitating and managing performance-based investment competitions based on model (virtual) investment portfolios, creating actual portfolios for the identified Best Investor, creating and operating actual mutual funds based on the identified Best Investors as fund managers, and providing a full suite of related subscriber and investor services associated therewith as a fund supermarket. The invention includes facilitation of daily feedback of one or more significant and appropriate financial performance metric(s), preferably the NAV (iTAV), of identified stocks and funds. Performance ranking of advice is provided so that the investor knows the track record (ranking), on an ongoing basis, of a particular advisor, thereby establishing credibility of comments. Important analytic tools are provided, including unique reports on: Overall Performance, Stratification, Volatility, Market Timing, Fundamentals, and $G_{S/E}$ or $G_{E/S}$ Ratio, which function as powerful decision tools for the site members, fund managers and subscribers. The top 100 Best Investors are recognized as the m100, which may be a list, a tracked index, and a Fund.

82 Claims, 8 Drawing Sheets

U.S. PATENT DOCUMENTS

| | | | |
|---|---|---|---|
| 5,262,942 A | | 11/1993 | Earle |
| 5,761,442 A | * | 6/1998 | Barr et al. ................. 705/36 R |
| 5,784,696 A | | 7/1998 | Melnikoff .................... 705/36 |
| 5,799,287 A | | 8/1998 | Dembo ........................ 705/36 |
| 5,819,237 A | | 10/1998 | Garman ....................... 705/36 |
| 5,873,071 A | | 2/1999 | Ferstenberg |
| 5,911,135 A | | 6/1999 | Atkins ......................... 705/36 |
| 5,987,433 A | | 11/1999 | Crapo .......................... 705/36 |
| 6,012,042 A | * | 1/2000 | Black et al. ............... 705/36 R |
| 6,370,526 B1 | * | 4/2002 | Agrawal et al. ................ 707/5 |
| 6,405,204 B1 | | 6/2002 | Baker ......................... 707/100 |
| 6,605,615 B2 | * | 8/2003 | Medina et al. .............. 514/311 |
| 6,606,615 B1 | * | 8/2003 | Jennings et al. .............. 706/45 |
| 7,149,716 B2 | * | 12/2006 | Gatto ....................... 705/36 R |
| 2001/0027430 A1 | * | 10/2001 | Sabourian .................... 705/35 |
| 2002/0042764 A1 | * | 4/2002 | Gardner et al. ................ 705/35 |

OTHER PUBLICATIONS

Fantasy Stock Market.com web site, http://www.fantasystockmarket.com, published May 5, 1999, retrieved from www.archive.org May 1, 2008.*

Dennis, Sylvia, "UK—Web-Based Virtual Stock Market Game A Success", Newsbytes (Jul. 17, 1997), Wakefield, Yorkshire, England.

"Software Introductions", Microbanker, vol. 15, No. 3 (Mar. 1995), United States.

Higgins, J. M., "Janus Capital's John Schreiber", Broadcasting and Cable, vol. 128 No. 34 (Aug. 17, 1998), p. 56, United States.

* cited by examiner

OVERALL PERFORMANCE

| STOCK | TICKER | SECTOR | RETURN | CONTRI-BUTION | % OF PORTFOLIO | |
|---|---|---|---|---|---|---|
| NOVOSTE CORPORATION | NOVT | CARDIAC MEDICAL DEVICES | 142.4% | 2,196,000 | 5.2% | |
| MINIMED INC | MNMD | CARDIAC MEDICAL DEVICES | 76.8% | 1,295,000 | 3.1% | |
| IMMUNEX INC | IMNX | BIOTECHNOLOGY | 73.8% | 5,043,000 | 11.9% | TOP PERFORMERS |
| SEPRACOR INC | SEPR | BIOTECHNOLOGY | 46.8% | 1,237,813 | 2.9% | |
| INCYTE PHARMACEUTICALS | INCY | BIOTECHNOLOGY | 45.7% | 2,012,811 | 4.7% | |
| CAMBRIDGE HEART INC | CAMH | CARDIAC MEDICAL DEVICES | 41.8% | 887,006 | 2.1% | |
| MEDTRONIC INC | MDT | CARDIAC MEDICAL DEVICES | 41.2% | 802,425 | 1.9% | |
| ENDOSONICS CORP | ESON | CARDIAC MEDICAL DEVICES | 40.3% | 45,450 | 0.1% | |
| CARDIMA INC | CRDM | CARDIAC MEDICAL DEVICES | 37.9% | 424,810 | 1.0% | |
| GUIDANT CORP | GDT | CARDIAC MEDICAL DEVICES | 25.3% | 2,088,061 | 4.9% | |
| PE CORP-CELERA GENOMICS GR | CRA | BIOTECHNOLOGY | 23.7% | 1,842,500 | 4.3% | |
| ALZA CORP CLASS A | AZA | DRUGS/MEDICAL SUPPLIES | 8.5% | 1,859,344 | 4.4% | MID PERFORMERS |
| MILLENNIUM PHARMACEUTICALS | MLNM | BIOTECHNOLOGY | 6.5% | 2,571,525 | 6.1% | |
| PATHOGENESIS | PGNS | DRUGS/MEDICAL SUPPLIES | 6.1% | 507,780 | 1.2% | |
| MEDIMMUNE INC | MEDI | BIOTECHNOLOGY | 5.0% | 2,437,750 | 5.7% | |
| AMGEN | AMGN | BIOTECHNOLOGY | 2.2% | 2,258,600 | 5.3% | |
| BOSTON SCIENTIFIC CORP | BSX | CARDIAC MEDICAL DEVICES | -2.6% | 3,254,419 | 7.7% | |
| MERICK & CO | MRK | CARDIAC MEDICAL DEVICES | -7.5% | 1,863,750 | 4.4% | |
| AFFYMETRIX INC | AFFX | BIOTECHNOLOGY | -12.5% | 2,226,563 | 5.2% | |
| IGEN INTERNATIONAL INC | IGEN | BIOTECHNOLOGY | -16.0% | 1,614,925 | 3.8% | BOTTOM PERFORMERS |
| BIOGEN INC | BGEN | BIOTECHNOLOGY | -17.3% | 2,424,663 | 5.7% | |
| JOHNSON & JOHNSON | JNJ | DRUGS/MEDICAL SUPPLIES | -24.7% | 423,537 | 1.0% | |
| BARD C.R. INC | BCR | DRUGS/MEDICAL SUPPLIES | -27.0% | 1,702,250 | 4.0% | |
| QUADRAMED CORP | QMDC | HEALTH SERVICES | -34.1% | 1,423,413 | 3.4% | |

*FIG. 6C*

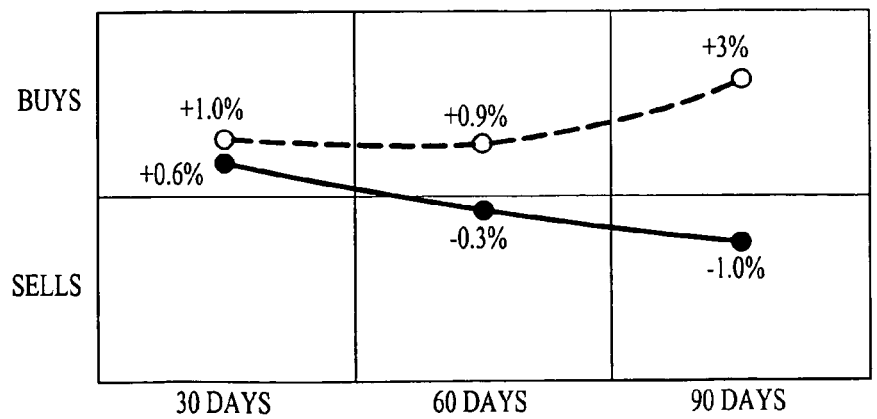

*FIG. 6D*

INTERNET-BASED SYSTEM FOR IDENTIFICATION, MEASUREMENT AND RANKING OF INVESTMENT PORTFOLIO MANAGEMENT, AND OPERATION OF A FUND SUPERMARKET, INCLUDING "BEST INVESTOR" MANAGED FUNDS

CROSS-REFERENCE TO RELATED APPLICATIONS

This Application is based on the following three Provisional Applications, all filed by the same inventors under the same application title: 60/197,569 filed Apr. 17, 2000; 60/231,058 filed Sep. 8, 2000; and 60/261,885 filed Jan. 16, 2001; and of the following Regular Applications filed by Bruce Horn and Blake Ward: System And Method For Generating Personalized Messages, U.S. Ser. No. 09/610,164, filed Jul. 5, 2000; System and Method For Determining and Tracking Performance Metrics For Individual Investors, U.S. Ser. No. 09/610,160, filed Jul. 5, 2000; and System And Method For Ranking Individual Investors And Filtering Commentary Based On Ranking, U.S. Ser. No. 09/610,163, filed Jul. 5, 2000. The disclosure of each of these six applications is hereby expressly incorporated by reference. Priority of each of these applications is claimed under 35 U.S.C. §§ 119 and 120 and related International Treaties, Conventions and Accords.

TECHNICAL FIELD

The invention relates to an Internet-based business system and management programs therefor, and more particularly to financial investment management characterized by a unique system of attracting and identifying the best investors, including but not limited to offering and managing performance-based investment competitions based on model investment portfolios, creating actual portfolios for the identified best investor, creating and operating actual mutual funds based on the identified best investors as fund managers, and providing a full suite of related subscriber and investor services associated therewith as a fund supermarket.

BACKGROUND ART

There are approximately 8,000 professionally managed mutual funds in operation in the United States, and the number grows annually. Each year, 80% of them fail to beat the S&P 500 Index, and that statistic alone has spawned an entire class of Index Funds, i.e., funds that track various equity indexes, such as the S&P 500, the NASDAQ 100, the Russell 2000, AMEX, DJIA, NYSE, and the like. Much of the financial news media highlights those professional managers who have beaten the market over some length of time. However, the universe of managers from which such achieving managers, often called "superstars," is drawn excludes many investors who manage their own investments. Accordingly, the identification of star performers is currently drawn from a small subset, professionals, of the universe of all investors.

The most basic question that any investor has is: "How am I doing?" In the case of the typical, non-professional investor, this question is hard to answer because their pattern of investing is irregular. Current typical methods of determining return on investment assume either a single investment with a regular stream of payouts, or a schedule of uniform investments over time. Any stream of investments and payouts that is not constant yields misleading performance results.

In the case of professionally managed mutual funds, which have cash inflows and outflows on an irregular, and typically unpredictable basis, the Net Asset Methodology (NAV) takes these variables into account. The investment performance, typically a calculation of investment return of the fund based on NAV per share, has become commonly accepted among the professional money management community, and is widely regarded as the most accurate way to measure investment performance. However, there is currently no way for individual investors to apply this methodology to their own portfolio(s).

A shift in demographics and societal norms, particularly driven by the Internet-driven information access, that is fundamentally altering the way individuals manage their personal financial assets. Increasingly, consumers are taking direct control over their personal financial affairs because: 1) advances in technology make it easy to do so, 2) it is more convenient and less expensive than relying on financial intermediaries, and 3) the poor or erratic performance of the professionally managed funds encourages investors to manage their own funds, not only for the financial rewards, but also because of the intellectual and financial challenge, and the satisfactions derived from those management activities.

Investors want the flexibility to invest at times and in places that are convenient for them. The broad availability of financial information on line promises to dramatically narrow the gap between the resources available to the individual investor and the institutional investor. Individual investors have become increasingly sophisticated and knowledgeable about investing, having experienced greater access to stock quotes, company financial information, investment advice, and other investment information on the Web or through other services. As investors obtain even greater access to these resources, they will desire even greater control over their financial decisions and seek alternative ways to invest more successfully.

There is currently no way for investors to: 1) see the whole investment picture; 2) objectively and independently measure their own success, 3) compare their own performance with other investors; 4) obtain advanced, accurate and highly pertinent metrics by which their performance and investment management skills growth can be measured; 5) obtain access to a universe of high-performing investors for analysis, commentary and exchange of investment ideas; and 6) enter the field of fund management as a professional based on building a performance track record. In part this gap in the whole investment picture is due to a lack of a way and medium in which similarly-minded individual investors can communicate to empower themselves to make better personal investment decisions with the benefit of a larger group's insight, but with the key difference as compared to investment clubs, that the insights can be gauged against objective metrics.

To Applicants' knowledge, there are no prior art Internet-based systems offering identification of the best investors in a large universe of investors. In the arena of feedback services, Clearstation and Iexchange offer feedback on tips only, not an entire portfolio. Various online tracking sites offer price history and total returns only. Off the shelf individual investment programs such as Intuit's Quicken are not intuitive, are expensive and often are not web-based nor integrated with actual trades. Professional financial advisors, of course offer investment advice and many execute trades, but 8 of 10 managers fail to beat the passive index.

In the arena of investment advice, there are various on-line bulletin boards, but none rank advisors, and even if the advisor is known, the actual performance is not disclosed. Rumor and speculation is not distinguished from performance-based evaluation. An example is the investment swindle involving an anonymous tipster on a financial Web site (Raging Bull). The tipster sang the praises of E-pawn.com, a Florida-based Web site. That turned out to be part of a "pump-and-dump" scheme, which scheme is part of a federal indictment by the US Attorney's Office in New York, in which 120 people were charged in the summer of 2000 with securities fraud and related crimes. E-pawn was 1 of 35 companies whose stock was manipulated, at a cost of approximately $50 million to investors.

The use of community-based investment approaches has been pervasive for as long as there have been individual investors. Before computers, and continuing to this day, individuals in investment clubs pool their ideas in the hopes of increasing their returns. Many of these clubs started out informally, through schools or churches. Now, the AAII (American Association of Individual Investors) and other private organizations have formal networks of investment clubs throughout the nation. These associations provide educational and organizational services for their members. With the advent of browsers, community investing moved effortlessly onto the web, even before the mid 1990's. Bulletin boards sprang up immediately and have since mushroomed, allowing individuals all over the world to share their investment ideas with investors everywhere.

Some organizations have attempted to cull the "best" ideas from the bulletin boards, but that is very difficult, given the existing methodology. Everyone has an opinion, but many so-called experts post comments under aliases. It is very hard, if not impossible, to tell who is speaking, and what their motivation is. For example, are they pumping the stock, and if so is it part of a stock fraud? Is it a 14 year old who has never invested a dime? Or, is it a long time investor with a poor track record? There is no requirement that they be skilled investors with proven track records, or that they are honest and truthful, or hold the stock that they tout, and for what reason (e.g., to get out of a bad position, or to hype the stock for a quick kill). Sample bulletin boards include: Yahoo, Motley Fool, and Silicon Investor). Attempts so far to measure the abilities of bulletin board participants have been limited, and for the most part, unsuccessful.

Sites that measure ability focus on whether or not a particular individual recommends a stock that subsequently performs. This attempt at measuring stock picking does nothing to address issues of when to buy/sell, asset allocation, or the ability to make money in a total portfolio. Examples of stock picking sites include Iexchange.

A few mutual funds have launched within the last year or so, basing their stock picks on those of their community. In these community-based funds, an "ubermanager" reviews the stock picks of many community members, decides, based on unpublished criteria, which ones may have validity, and then acts on those for the good of the fund. These funds are called "community" funds. One serious problem with such type of funds, beyond their track record on not having done very well (see, for example, the funds of sites StockJungle and Mutual Minds), is that they are managed, in essence, by committee. Further, they are subject to mass opinion manipulation and momentum-based transactions, which may also be characterized as a "hype-sensitive investment climate" resulting from investors second-guessing their own investment approach by combining their ideas with the opinions and decisions of others in the community. Community-based investment decisions tend to result in voting for stocks to be included in a fund.

With respect to credibility, Clearstation and Iexchange offer rankings on tips only, not overall performance. With respect to performance, various mutual funds and advisors can only push level of service, and make it clear, for liability purposes that they cannot guarantee performance.

Thus, there is a strong and continuing unmet need in the financial services market which provides daily feedback of a significant and appropriate type, both qualitatively and quantitatively, for investors to answer their prime questions, especially in a volatile market, of: "How am I doing?" and "How can I do better?." There is also a need for ranked advice so that the investor knows the track record, on an ongoing and near daily basis, of a particular advisor in order to gauge credibility. There is a need to widen the pool of high-performance advisory investors and a system of establishing their credibility. Finally, there is a need for a system that can continuously and iteratively identify and build funds around the best investor performers in every sector.

DISCLOSURE OF INVENTION

Summary, Objects and Advantages

The invention relates to an Internet-based business system and management programs therefor, and more particularly to financial investment management through an Internet site offering to members (observers, subscribers and "best investor" competition participants), a full suite of portfolio management, educational and analytic tools and metrics. The Internet-based investment services architecture of the inventive business method is characterized by a unique, multi-phase system of attracting and identifying Best Investors (herein "BI's"), including, but not limited to: I. Offering and managing performance-based investment ranking and/or competitions based on model investment portfolios (virtual portfolios), and identifying "Best Investors," in a first phase; II. Operation of actual portfolios by members, including new ones created by the identified Best Investors for themselves, in a second phase; and III. Creating and operating actual mutual funds based on the identified Best Investors as fund managers in a third phase. A full suite of related subscriber and investor services associated therewith is facilitated and provided in all phases, including a fund supermarket in the third, and/or second phase.

The site herein is identified as the M-Site, an abbreviation for the hosting/sponsoring site managing entity, "Marketocracy." The management of actual portfolios and BI funds is handled through an M-Site subsidiary that is a registered Broker-Dealer. The inventive investment services hosting site, the M-Site, offers investment services to investors who access the services via the Internet using various investor-accessed computer devices, such as laptops, desktop computers, PDAs, handheld computers, phones and pagers, network computers and the like, over land lines, satellites or wireless connections. The M-Site facilitates the creation of model or/and real portfolios and manages them, including executing real and simulated (virtual) trades, and providing both generic and personalized data and analytic tools that enable the investor members to learn investing and manage their own portfolios. The M-Site architecture includes message generation to, from and among site members and investors, including the creation and transmission of messages that are tailored to individual investor members based on message notification preferences selected by the individual investor members. The inventive system associates the preferences with the individual investor members, and selectively transmits messages to, from and among the members based on the selected message notification preferences. The inventive system also sorts and generates messages based on the investor member's performance, alone or in combination with the selected preferences.

The objects and advantages of the Internet-based financial services market business method and computerized system of the invention include: facilitation of periodic, preferably daily, feedback of one or more significant and appropriate financial performance metric(s) or indicator(s), including the NAV of identified stocks and funds, that permit investors to answer their prime questions, especially in a volatile market, of: "How am I doing?" and "How can I do better?" As used herein the term NAV can refer to the asset value of either a real market fund or an investor's model portfolio. However, it is also convenient to distinguish between the asset value of a real fund from that of the investor (real or model) by referring to the investor's personal account value, i.e., the asset value of the investor's fund(s) created under the inventive system, as the "iTAV" (the "investor's Total Account Value") as an objective measure of performance over time despite changes the investor makes to his/her portfolio. Thus, NAV herein refers to a real or model portfolio or fund value, and iTAV refers to the personal account value of an investor.

The invention also provides a system of performance ranking of advice so that the investor knows the track record, on an ongoing and preferably daily basis, of a particular advisor, that is, establishing credibility of comments is facilitated in the inventive system by filtering the financial commentary of investor members based on the ranking of the commentators.

The invention significantly and dramatically harnesses the power of the Internet to widen the pool of high-performance investment advisors by a competitive system of attracting and identifying them through competitions involving trades in virtual portfolios (model portfolios) that mirror the actual market, and thus provides a performance-based system of establishing their credibility in the investment community. Finally, the invention provides a system that continuously and iteratively identifies Best Investors (BIs) and thereafter build funds around these Best Investor performers in every sector, permitting the BI's an opportunity to "turn professional" earning income as fund managers.

Thus, the inventive system is different from and may be contrasted to "community investing" or "collaborative funds" which are collective intelligence funds based on the collective knowledge of thousands of individual investors. Rather, the inventive system and its underlying architecture is based on good investing ideas coming from individual minds, the system facilitating locating the "Best Investors" in a large universe of interested investors, providing objective, relevant and useful metrics and analytic tools to them, and ultimately building funds around their investment approaches.

The initial candidate market for the inventive system focuses on two groups, those who think of themselves as active investors who may be "better than the pros," and those who want the "best advice." The former class of candidates are typically data-driven and look for quantification of their performance but seek a level playing field, e.g., one free of the disadvantages of stale information as compared to others having fresh or insider information, and are now trading on-line. The system of the invention offers the advantage of permitting individual investors to objectively and quickly track their own portfolio(s) performance and get advice and commentary from other ranked investors, and their ranking is associated with their commentary so that the inquiring investor can evaluate the credibility of the commentary. In short the commentary is "credibility ranked." The latter class of candidates may be thinking about trading on-line or may already be doing so, albeit minimally, but typically read or scan a limited suite of investment magazines or surf Internet sites devoted to financial advice, and have concerns about missing the boat due to insufficient information or lack of time or inclination to do the necessary research.

The system of the invention also offers investors to be ranked as Best Investors based on a predetermined, equal and fair set of known, recognized metrics that mirror the real world, with the opportunity to build mutual funds around the Best Investors in the World in every industry sector, and provide non-managing investors access to the world's best investors, the best advice, the opportunity to invest in funds created by the Best Investors and to purchase the services of a Fund Supermarket.

The inventive business method and system is best described as operating in Phases, wherein in Phase I, an Internet site is created to attract a vast pool of investors, provides a performance-based screening system of identifying the Best Investors by providing a clear and fair rules-based competition of forming Model Portfolio (MP) funds which are traded in a simulated (virtual) market that mirrors the activity of the real market, with the participating competing BIs receiving daily iTAV (NAV) reports on their funds and being ranked periodically. That is, the invention provides a competitive model portfolio system in a first phase wherein members and their portfolios (funds) are competitive. Individual member investors model portfolios compete with those of other members, in a mock fund management platform of the inventive system. Optionally, prizes may be awarded quarterly and/or annually.

In Phase II, the selected high-performing BIs (and optionally, all M-Site members) are invited to manage their own actual portfolios (trading in actual funds or stocks chosen by them) to take advantage of the feedback performance metrics and accounting and reporting services of the Site.

In Phase III, a family of BI Funds is created around the BIs identified in the Phase I and II screening process, with the BIs operating as the fund managers.

The BI's receive a plurality of reports, also called analytics or analytic tools, including a unique selection comprising: Overall Performance, Stratification, Volatility and Market Timing to assist them in their stock analysis and picking. The investment services hosting M-Site offers, provides and facilitates, via dynamic web pages, a full suite of observer/subscriber/member services, including: discussion boards; tracking of selected BIs; observing the site and BI activity; and fund investing in a full range of investment vehicles (stocks, bonds, options, cash (Money Market), funds of various types, etc.), in a broad menu of free and Fee-based services, typically in Phase II and III, and optionally in Phase I. Communications are managed with a suite of screen names, password protection, encryption and digital signature and authentication algorithms.

The invention also includes a full computer system for management of operations, communications, database operations, results analysis and reporting, processing, member, observer and subscriber relations, membership and subscriber base creation and billing. Examples include portfolio analysis programs that monitor the performance of the individual investor's portfolios on a trade by trade basis, computes the daily iTAV (NAV), and interfaces with a messaging program that to provide messages to the investor members on their selected preferences basis. The hosting site facilitates investors generating and managing model and real portfolios of a plurality of investment vehicles, and provides analytic tools that facilitate the analysis of the portfolios and the constituent individual investment vehicles, and further provides communication tools to generate, transmit and receive, archive, search, order (arrange, sort, rank, etc.) and retrieve financial information to multiple investors, including information personalized for particular investors of the Site. Income to the Site entity is generated through subscription and membership revenues, publications and reports revenue, operation of brokerage/dealer services, click-through fees and commission sharing with outside brokers, basis point selling agreements with mutual funds, and fund operating commissions and sales, and the like.

Where prizes are awarded for performance (optional, as noted above), a complete set of rules is implemented to level the playing field and to prevent "gaming the system." The typical way to game a stock-picking contest of any kind is to make a wild bet on a highly volatile stock and hope it shoots for the moon. Existing stock contests do very little—(most do nothing)—to prevent this type of gaming. The rules of the inventive system ensure that one or two "hot" picks will not have an undue effect on performance. For example, for compliance, the inventive M-Site rules require that contest participants have at least 20-25 stocks. Not charging commissions is another way stock contests get in trouble. Frequent traders are not penalized, encouraging day trading that would actually be very expensive in the real world. Accordingly, the M-Site contest rules charge typical commissions on the virtual trades, thus charging a net of trades cost or return to the postion (portfolio).

Order filling can cause another set of issues. When a participant places an order, many sites just fill the order at the current price or closing price. To avoid this, The inventive M-Site runs a market simulation that matches orders with the real market, so that an order is filled only when its price "occurs" in the real market, i.e., matches a trade in the real market at that price. Thinly traded stocks can be traded on most sites in amounts that are never actually traded in the real market. In contrast, the inventive system only fills trades in quantities that actually occurred in the real world. Most sites, as does the inventive M-Site, use a delayed stock price data feed. If the fill is not also delayed, a participant can game the system by looking up a current price on a real time feed, and then buying or selling the virtual stock in the contest 20 minutes ahead, knowing it will be filled at the desired price. In contrast, the inventive M-Site operation is designed with delayed fills. In short, the architecture of the virtual market of the inventive M-Site system ensures that the virtual market created on the site is as close as possible to the real market, that is the track records in the virtual market are as close as possible to the actual track records had the trades occurred in the real market.

The processes underlying the site operation, communications with site visitors and member-investors and the Internet-implemented business method as described herein may be implemented in software as computer-executable instructions that upon execution perform the operations illustrated in the several figures and described herein. The Web server(s) of the M-Site may be implemented as one or more computers configured with server software to host a site on the Internet, and that implement the serving of static, generally informational Web pages, and that generate and serve dynamic Web pages tailored to facilitate the delivery of the services and methodology described herein, including serving dynamic pages tailored to individual member investors that may be generated on the fly in response to individual requests from the investors via their Internet linked access devices (computers, PDAs, cell phones, pagers, etc.).

The computer(s) of the invention can be configured in a system architecture, for example, as one or more server computer(s), database computer(s), routers, interfaces and peripheral input and output devices, that together implement the system and network. A computer used in the inventive system typically includes at least one processor and memory coupled to a bus. The bus may be any one or more of any suitable bus structures, including a memory bus or memory controller, peripheral bus, and a processor or local bus using any of a variety of bus architectures and protocols. The memory typically includes volatile memory (e.g., RAM) and fixed and/or removable non-volatile memory (e.g., ROM, Flash, hard disk including in RAID arrays, floppy disc, mini-drive, Zip, Memory stick, PCMCIA card, tape, optical (CD-ROM, etc.), DVD, magneto-optical, and the like), to provide for storage of information, including computer-readable instructions, data structures, program modules, operating systems, and other data used by the computer(s). A network interface is coupled to the bus to provide an interface to the data communication network (LAN, WAN, and/or Internet) for exchange of data among the various site computers, routers, and investor computing devices. The system also includes at least one peripheral interface coupled to the bus to provide communication with individual peripheral devices, such as keyboards, keypads, touch pads, mouse devices, trackballs, scanners, printers, speakers, microphones, memory media readers, writing tablets, cameras, modems, network cards, RF, fiber-optic and IR transceivers, and the like, A variety of program modules can be stored in the memory, including OS, server system programs, HSM (Hierarchical Storage Management) system programs, application programs, other programs modules and data. In a networked environment, the program modules may be distributed among several computing devices coupled to the network, and used as needed. When a program is executed, the program is at least partially loaded into the computer memory, and contain instructions for implementing the operational, computational, archival, sorting, screening, classification, formatting, rendering, printing and communication functions and processes described herein.

The member/investor, markets, indexes, financial instruments, company, etc., data are stored in one or more sets of data records, which can be configured as a relational database (hierarchical network, or other type database) in which data records are organized in tables, which records may be selectively associated with one another pursuant to predetermined and selectable relationships, so that, for example, data records in one table are correlated to corresponding records for the member/investor (or market, financial instrument, company, etc., as the case may be) in another table and the correlation or individual datum is callable for rendering on screen, printout or other activity pursuant to the inventive method and system. The hosting site facilitates investor generating and managing virtual and real portfolios containing one or more financial instruments, and provides both analytic tools that facilitate the analysis of the performance of the portfolios and individual investment instruments or vehicles, and communication tools to generate, transmit and receive, archive, search, order (arrange, sort, rank, etc.), retrieve and render financial information to multiple investors, including information personalized for particular investors.

BRIEF DESCRIPTION OF THE DRAWINGS

The invention is described in more detail with reference to the drawings, in which.

DETAILED DESCRIPTION, INCLUDING THE BEST MODE(S) OF CARRYING OUT THE INVENTION

The following detailed description illustrates the invention by way of example, not by way of limitation, of the principles of the invention. This description will clearly enable one skilled in the art to make and use the invention, and describes several embodiments, adaptations, variations, alternatives and uses of the invention, including what are presently believed to be the best modes of carrying out the inventions.

In this regard, the invention is illustrated in the several figures, and is of sufficient complexity that the many aspects, interrelationships, and sub-combinations thereof simply cannot be fully illustrated in a single figure. For clarity and conciseness, several of the figures show in schematic, or omit only certain aspects of a particular method, feature or principle of the invention, while omitting those that are not essential to or illustrative of that aspect or principle of the invention. Thus, the best mode embodiment of one aspect or feature may be shown in one figure, and the best mode of a different aspect will be called out in one or more other figures, interrelationships or discussions.

All publications and patent applications cited in this specification are herein incorporated by reference as if each individual publication or patent application were specifically and individually indicated to be incorporated by reference.

Figure 1:
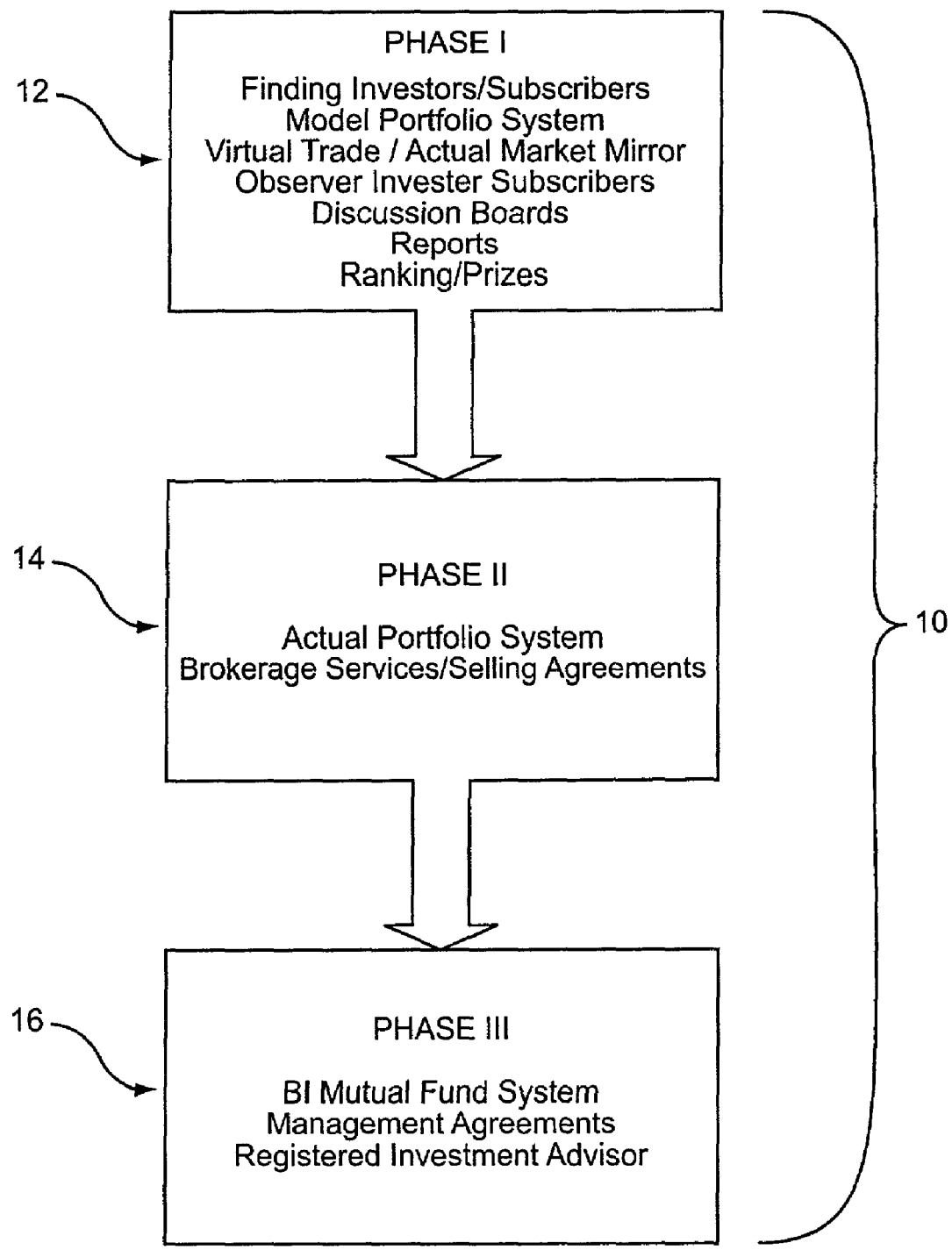
FIG. 1 is a schematic diagram of the inventive multi-phase Internet-based financial management business method and system, including the identification of "Best Investors" through a competitive model portfolio system in a first phase, the creation and management of actual portfolios of the "Best Investors" in a second phase, and a full service Fund Supermarket in a third phase.

Turning first to FIG. 1, the Internet-based business method and financial management system of the invention 10 can be characterized as having a plurality of phases, conveniently considered for ease of description into three phases, although the precise "boundaries" of the phases may be flexible, with some of the functions of one phase being shifted into another. Likewise, it should be understood that in full operational steady-state, more than one phase can be in operation simultaneously, for example the functions of finding the Best Investors is an ongoing operation, and in the mature business, the Fund Supermarket operation will occur at the same time as "new" Best Investor candidates are being introduced into the system.

In FIG. 1, Phase I, 12, is directed to the system of finding investors and subscribers through the model portfolio system of the invention. In a first, currently principal and best mode embodiment a competitive system, including an optional contest approach, is used to interest and identify Best Investors. The competitive approach (or contest) is based on the proposition that the "Best Investors" will be able to learn and prove investment acumen through a model portfolio competition, and thereby qualify for an opportunity to manage real money, both virtual and real money management using the Site metrics and services. The competition is ultimately against the market, but by virtue of the performance metrics being objective and independent of the start date, member investors and their funds are competitive with each other and with professionally managed funds. In the optional contest, prizes may be awarded on a periodic basis, e.g. quarterly, as described in more detail in the attached Appendix A, "Marketocracy's 'Who is the Best Investor in the World?™' Competition Rules."

These steps of interesting candidates, screening them, and identifying them as Best Investors involves setting up a simulated trading world in which the candidates register with the sponsor (hosting) site to receive an allocation of $1 Million simulated cash per fund, which to permits the candidate to create plural funds, up to a predetermined maximum, say 10 funds, for simultaneous management by the candidates. The candidate's fund(s) are then traded in a simulated trading market under defined rules (see Appendix A) that mirror the actual market.

The system of the invention permits a member/ investor subscriber to competitively manage $1 mm in virtual funds (cash and financial investments such as stocks and bonds), build their own performance record of their stock picking and portfolio managing ability, take advantage of the analytic tools offered by the system, and compete for BI honors and rewards. The system allows BI's to manage a fund just like a professional, and determine if they can manage a portfolio or fund better than a professional.

The system of the invention permits and facilitates the members creating and managing various levels of fund complexity, ranging from simple "Beginner Funds" e.g. a virtual fund that can be limited to a small number of stocks, and/or not require, or permit rebalancing or diversification amongst several financial instruments (cash, bonds, stocks, and the like), to Advanced Funds, in which the portfolio has a full range of financial instruments. An Advanced Fund, is typically a more targeted fund, such as a Sector, Diversified or Hedge fund, and has extensive compliance rules (discussed in more detail below).

The site also includes pages of educational and informational content for members and visitors, and typically will include a series of definitions, columns, articles, critiques, training exercises on use of the analytic tools, tips and hints type of information for creating and managing various levels of portfolios. Members can begin by selecting a few stocks for their first fund portfolio, which may be less than a full suite of stocks. In addition, they can watch other stocks that, in their judgment, they may want to add to the portfolio as market conditions or performance merits. The system of the invention includes provision for automatic tracking of the list of stocks being watched and reporting to the member, e.g. daily, weekly or other time period, the stock pricing, trading volumes, unfilled (open) orders, canceled orders, news releases and the like about the stock. The member can add and delete from the list of stocks to watch by simple menu selection.

Discussion boards, and, optionally, reports (described in more detail below), are open to observer-investors who do not wish to compete, on a free, partially free or paid subscriber basis. Exemplary of these services are discussion boards in which the Best Investor (BI) candidate competitors post their observations and comments about stocks, funds or other financial instruments in their portfolios, general market conditions or trends, reasons for their choices, and the like. That is, investor members can have their own discussion boards, Best Investor performance can be evaluated on overall performance per fund/portfolio, and can be stratified by sector (e.g. electronics, chips, capital goods, entertainment, biotechnology, pharmaceuticals, airlines, utilities, metals, cyclical consumer goods, energy, conglomerates, and the like).

In one important embodiment, the comments may be sorted for ease of access, e.g., multiplex sorted by BI name or ranking, by fund, by stock, by sector, etc. The BI competitors' funds performances are tracked daily by calculating the respective Net Asset Values (NAV or iTAV) and the % gain or loss from inception and/or for the preceding period (e.g., daily, weekly, monthly change), which is then reported to them (e.g., by being available on the individual BI Member's assigned page in the Marketocracy Site). The BI Member (BIM) page is typically made available only to the BIM via a password protection gateway, and may be encrypted. Optionally, the iTAV/NAV may be made available on a public page of the M-Site. Facilitating the buys, sells, stock watching, rebalancing, analysis, measurement, and the like, are realized by conventional pop-up menus, including stock quotes, transaction previews and the like. The analytic tools facilitate the members to evaluate their portfolio of investments on an ongoing basis, and the measurement tools, primarily the iTAV/NAV and its % change, permit the members to ascertain their capability and competitive standing.

The model portfolio performances of the BIM competitors is ranked periodically (e.g., weekly, monthly, quarterly, semi-annually, yearly) by NAV, and reported publicly. This reporting of the BI rankings will be a significant news event, and gives the top performers significant credibility. Optionally, prizes may be awarded based on performance ranking. Likewise, the periodic rankings carry appropriate public recognition for performance based on the NAV metric, e.g., "Best Investor of the Year."

In one embodiment of the inventive site, the member's fund page(s) are where the member manages his or her fund(s) in competition with other members and their funds. It is also where members can receive and send e-mails, keep track of favorite or watched stocks, receive alerts about stocks, news, rankings, subscription and fees information, new features of the site, and the like. The alerts are typically preference driven (i.e., selected through a check-off selection menu) and e-mail delivered, and can be selected by the site manager or the member, for a preselected period of time, e.g. 2+ weeks to cover vacation periods, holidays, etc. The analytic tools provide various charts, tables, graphs, and text about how the overall fund portfolio has preformed over the chosen period. A summary section can precede more detailed analytics, and in one embodiment is selectable to be automatically forwarded to the member's fund(s) page, with the detailed analytic pages and reports accessible through a menu of links on the summary page. Encryption-enabled browsers are preferred for member access to their pages and data. Screen names are permitted for privacy, but only within the site guidelines against multiple identities. Each member can automatically track a selected list of the transactions of their favorite BI. For example, they may wish to track the top 5 or 10 of the "m100" list (list of the top performing BIs, discussed in more detail below). Members' fund page(s) can be organized in any convenient way with a wide range of relevant content, and links to related and/or more detailed sub-pages are provided, including by way of example and not by way of limitation:

Current NAV as of given date with Performance in %, for the day and since inception;

Links to analytic tools, such as charts, reports, etc.;

Portfolio summary, including overview, quotes on stocks and bonds, cash position, stock position, (long/short) % portfolio gains, losses, dividends, splits;

Links to related news items, including headlines by Ticker symbol;

Links to BB or Member comments, including favorite BI tracking;

Pending Activity, open orders and watch lists, short liability, cash available (net open orders) for stock buys, and the like transactional information;

Transaction templates for Buys & Sells, including type of transaction, stock ticker symbol, shares, price limits (Market or Limit order), open order terms (Day, Market opening, longer term), Commission payable; total price; resulting % of portfolio, Sector/Diversified Not Qualified warning (Out of Compliance Warnings); Place/Cancel/Edit/Revise Order Buttons; Trading Notes, (log or reasons for trade); Comments to BB, e-mail links, and the like; and A mini chart on Stock price and trading range over time of particular stocks, including ticker symbol.

A wide variety of Discussion Boards/Bulletin Boards (BBs) may be facilitated, e.g. public boards where comments are posted in as received real time on topics of the poster's choosing; sector boards, beginner's boards; individual members boards, e.g. wherein a BIM posts a comment, observation, stock pick, reason for a move, or the like, and visitors post comments in reply, and the like. A "Contact Us" link is provided for members to input comments, suggest improvements to the Site, and the like. Member, or broader community BB's may have sub-categories, including but not limited to tracking of real market, individual stocks, investment mood, particular sectors, financial news, IPO announcements; and may include search tools, links, analysis/commentaries/articles, and suggestions.

As the site members see the feedback metrics and the reporting and accounting services of the Site, they will want the same for their own portfolios. This is Phase II, 14 of FIG. 1, wherein members, including BIMs may trade on the actual market through the broker of their choice or directly through the M-Site, allowing them to consolidate all their trading activity through the site. In addition to the M-Site's own brokerage/dealer services, links are established with third party brokers, and selling agreements are entered into with them to execute trades at the election of the members. A full suite of accounting and reporting services are created and employed for the functionality needed.

The Phase II transitions smoothly into Phase III, 16 on FIG. 1, in which one or more mutual funds are built around individual BIs who have gone through the identification and screening process of Phases I and II. These funds are open to all investors through a variety of distribution channels, such as brokers and the M-Site. Management agreements are entered-into between the M-Site fund management company and the BIs as Fund Managers. The M-Site management company is a Registered Investment Advisor, and offers a complete suite of fund share purchase services to the investor/subscribers in a Fund Supermarket.

In all Phases, the M-Site offers a broad menu of site information pages and financial services, including e-mail, reports, technical, business and financial related news, access to public company information such as prospectuses, annual reports, S-1, 10 K, insider sales, etc., financial analysis columns and articles, bulletin boards, BI Model Portfolio and BI Fund performance reports, and the like. Member participation forms are provided in on-screen template and downloadable form from the site for members to invest in Mutual Funds of the Site Mutual Fund Supermarket.

Figure 2:
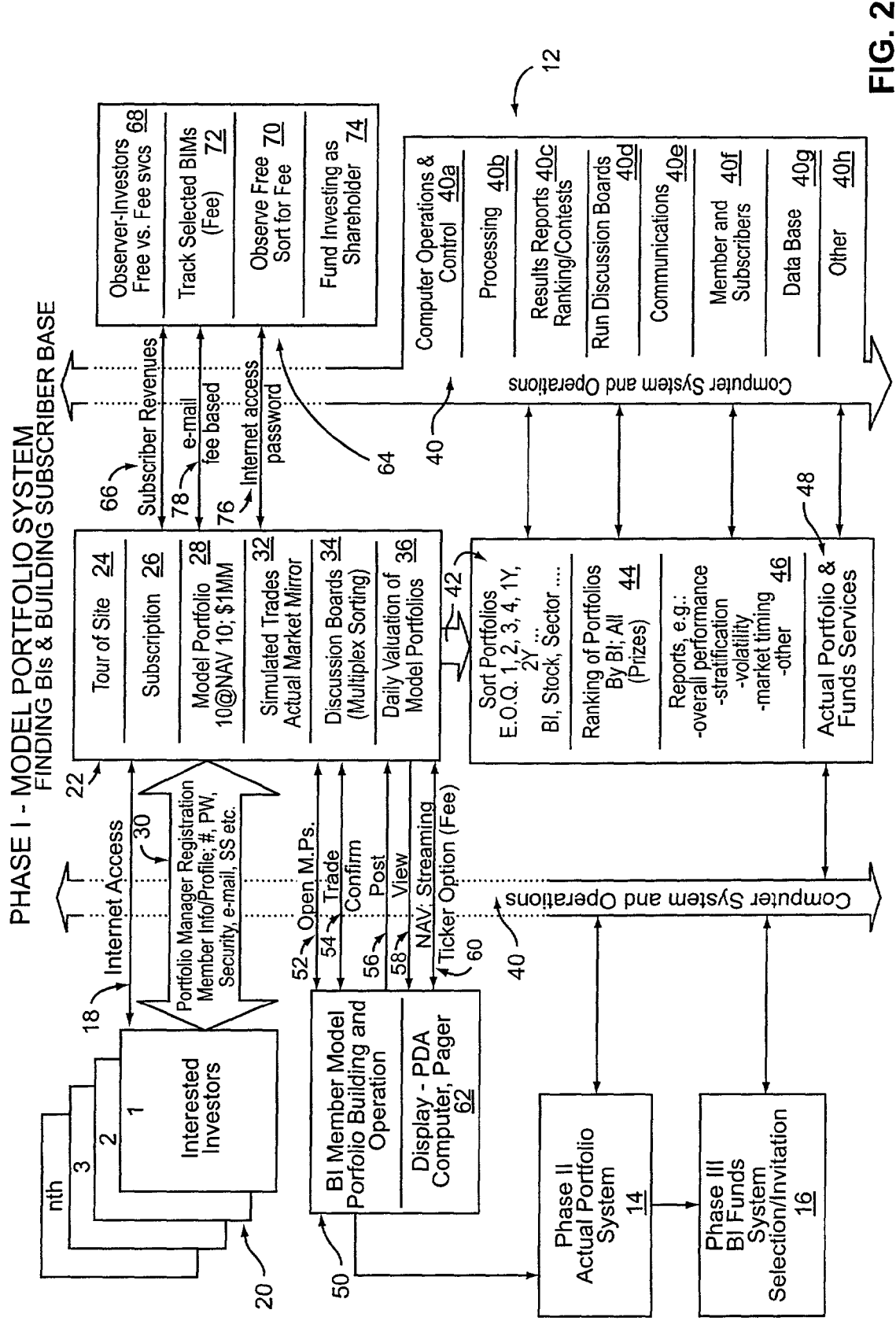
FIG. 2 is a schematic diagram illustrating in detail the structure and operation of the Phase 1 Model Portfolio System of the invention.

FIG. 2 illustrates in detail the Phase I model portfolio system, 12, of FIG. 1 through which BIs are found and a large membership/subscriber base is built. Via Internet 18, interested investors 1, 2, 3, 4, . . . , n access the M-Site 22 for a tour of the features and offerings. They basically have the option of exiting through no interest, subscribing to some or all of the services 26, or registering for the model portfolio competition 28. The membership/subscriber and contestant registration includes interactive menus, typically in template or style sheet format, that the subscriber and prospective BI fills out, 30, which typically includes member profile information, screen name, member number assignment, password (PW), security (e.g., encryption, optional), e-mail set-up, Social Security Number (for prize awards and purchases), and the like. Completion of registration requires rules and conditions of service review and acceptance. Visitors and members are offered a template for them to enter a friend or acquaintance's e-mail address and the site sends them an invitation to join.

Upon registration, up to 10 model portfolios (by way of example) each having a NAV (iTAV) of M$10, are set up for a total of M$1,000,000 (M$ being understood to be the allocated fictional Marketocracy dollars). The trades, 32, in the individual BI Model Portfolios (BIM P-1, -2, . . . -10) are simulated trades which mirror the actual market, i.e., NYSE, NASDAQ, etc. The BIM member number (and/or screen name) and password provides the BI access to discussion boards, 34, and the site operator posts daily the valuation of each model portfolio in terms of its NAV on special pages, 36. In the present best mode embodiment of the inventive method, the NAV postings 36 and Report pages (see below) are private to the individual BIs, i.e., are delivered to and rendered on the individual member pages, but as an option they can be made "public" to subscribers or the rest of the BIM community of contestants. Typically the discussion board postings 34 are sortable, by conventional sorting algorithms, so that postings can be grouped or sorted in a variety of categories, e.g., by BI, by Model Portfolio, stock, industry sector, etc.

It should be understood that underlying the business method of the invention are conventional computer systems and operations, 40, which run the appropriate management, analysis and communication software that includes the functionality described herein. Based on the disclosure herein of the business model and system operations functionality, one skilled in the arts of information technology systems and management, and computer programming will be able to select, provide and integrate appropriate commercially available computer hardware configurations, operating system programs and application programs, and as needed create such additional code as may be required to execute the functionality described in a wide variety of formats. In this regard, note that the computer systems and operations 40 are shown in FIG. 2 in relation to the three columns of features and aspects of the invention as being between both the first and second, and the second and third column, i.e., on both sides of the center column. This illustrates that the computer system spans and facilitates all the BI, subscriber and public communication interactions and back room operations of the inventive business model and system of the invention. The interactive arrows to and through the computer system and operations indicate that the respective features and interactions are computerized and pass through and are executed via computer system 40.

For back office operational analysis, it is within the scope of the invention that the site communications to members and the between members can be tracked and mapped, the result being a "network" interconnection diagram which reveals the information traffic flow in the site/system investor universe, and identifies critical nodes for information flow bottlenecks or sources and direction of flow of information of high current interest. This analytic tool assists in management of information flow, and design of the architecture for operation of site hierarchical information transfer, and data management and storage systems of the invention. As shown on the left of FIG. 2, the computer system and operations 40 includes computer operations and system control 40a, all processing 40b, results analysis and reports generation, and the rankings and contests operation and prize awards 40c, operation of the discussion boards, including the multiplex sorting, exchange of messages, postings, uploading and downloading 40d, all communications between the parties using the system 40e, BI member and subscriber contacts, registration and communication 40f, the operation and management of the data base(s) including ongoing analysis of the data base structure and storage, search and retrieval performance 40g, and other operations, including but not limited to site sponsor investor/shareholder relations and corporate operations and record keeping, advertising and promotions, financial operations including billing and collections, IT operations, and other management operations and functions.

Continuing with FIG. 2, the model portfolios in the current best mode aspect may be processed and managed 42 in a variety of ways. For example, the portfolios may be sorted quarterly and yearly by: BI; iTAV/NAV; individual stocks; industry sector; number of trades; frequency of trades; profit per trade; holding period per stock or average holding period; etc., and the sortings and analysis may include a variety of correlations, e.g., to insider trading, prime rate changes, various indexes, and the like. Then, portfolios of the BIs and all portfolios are ranked, 44, by iTAV/NAV typically quarterly (current quarter performance) and on an accumulation basis (half year, 3 quarters, yearly, etc.).

Special reports 46 are generated on each of the individual BI model portfolios. The current best mode includes four special reports: 1) Overall Performance, which rates the given BI model portfolio against the market in general (S&P 500), or against comparable industry sector or the like, and can show the cumulative history quarterly; 2) Performance Stratification of given BI model portfolio (fund) stocks for a given quarter, including the identification of the stock, the sector, the return, the contribution and percentage of the portfolio, ranking them from highest to lowest in order, and stratifying them by group, e.g., into three or more groups of Top Performers, Mid Performers and Bottom Performers; 3) Volatility of the portfolio or individual stock , typically as + or − a break even value; and 4) a Market Timing analysis, typically three, 30-day segments of each quarter, showing the performance of the Buys as compared to the Sells in percentage gain, conveniently in graph format. Similarly, in Phase II Actual Portfolios 14 and Fund Supermarket services of Phase III 16, are managed, 48, within the system.

In relation to the BI Members, the system of the invention includes BI Member model portfolio building and operation 50, including the related opening of the Model Portfolios (MPs) 52, the trading (orders and confirmations 54, posting 56 of analysis and other communications or comments by the BIs on the discussion boards 34, the receipt and viewing by the BIs of communications 58 on the discussion boards and from the Site manager/sponsor/operator, and receipt 60 of the daily NAV valuations and, optionally, a fee-based streaming ticker service (e.g., 15-20 minute delay service, real time, or near-real time), depending on subscription cost. These communications may be arranged by the BI with the M-Site for various levels and modes of display, 62, e.g., on a Personal Digital Assistant (PDA) such as a Palm Pilot, on a computer linked by modem, DSL, cable or wireless, etc., connection, or on a wireless pager or cell phone display.

Figure 4:
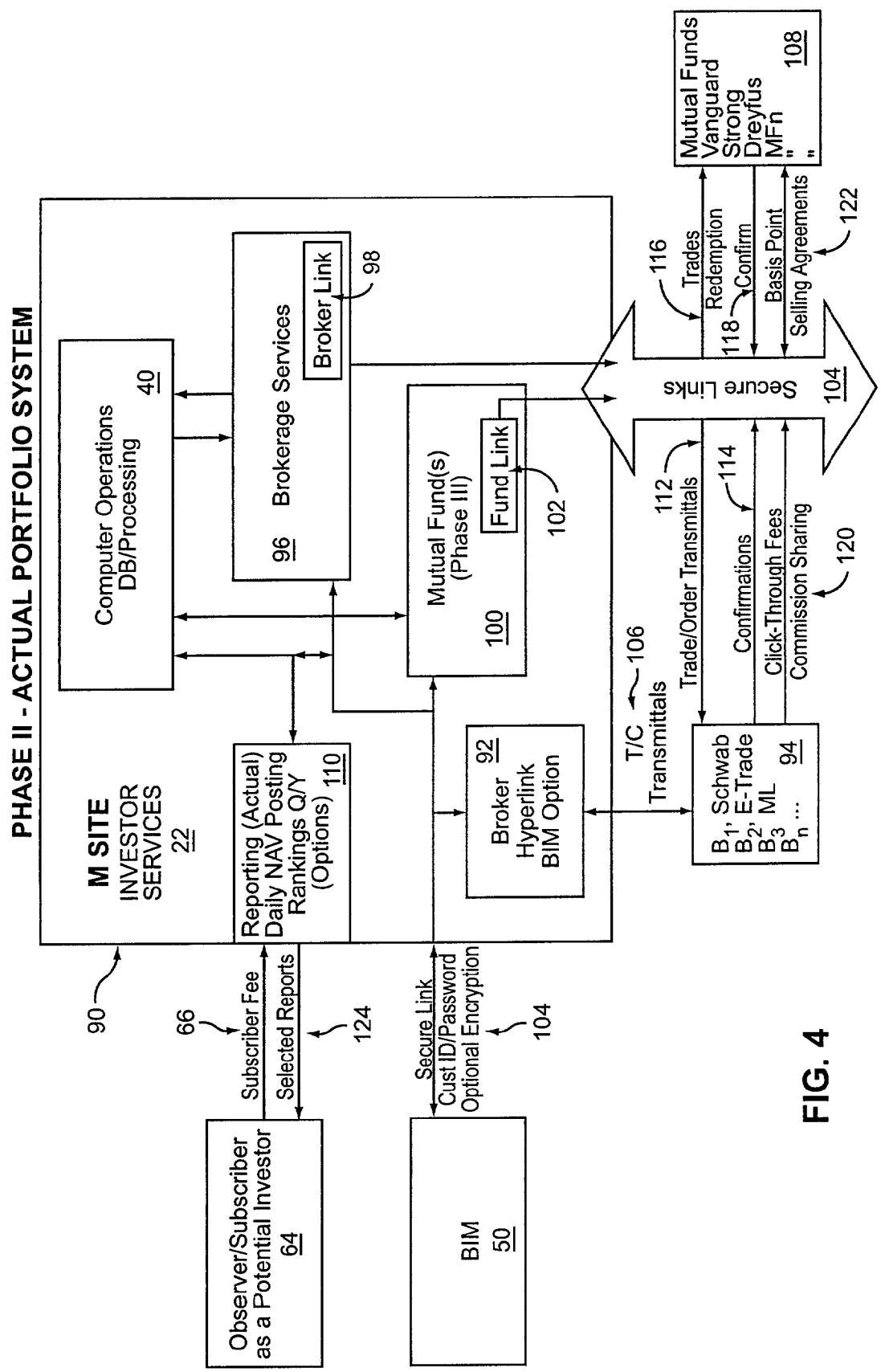
FIG. 4 is a schematic diagram illustrating in detail the structure and operation of the Phase II Actual Portfolio System for the "Best Investor" members, various subscriber options available in this phase and the relation to the Phase III BI Finds System and the Fund Supermarket.
Figure 5:
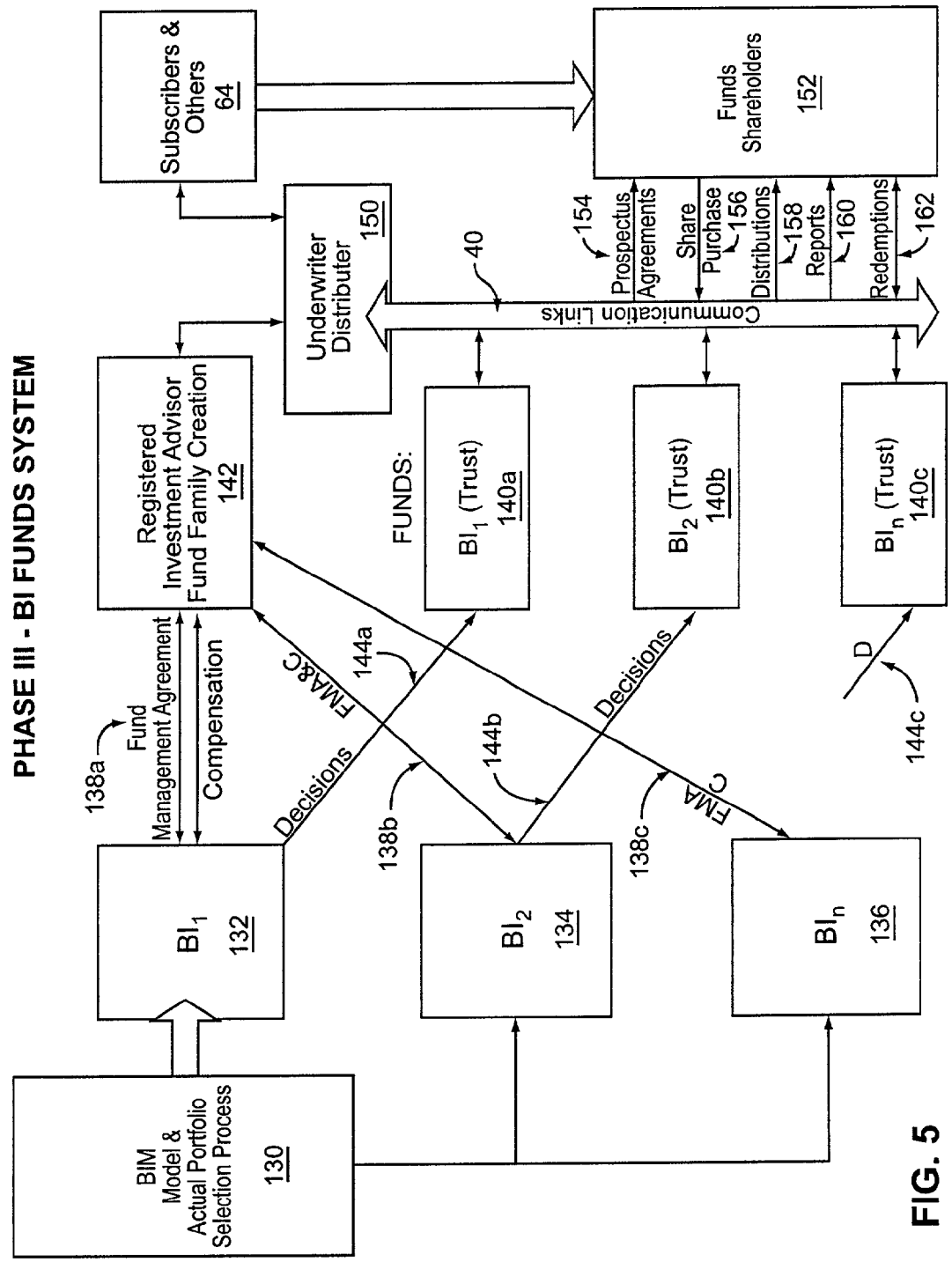
FIG. 5 is a schematic diagram illustrating in detail the structure and operation of the Phase III BI funds System of mutual funds created around identified Best Investors as fund managers.

As noted above and as shown in the lower left of FIG. 2, the M-Site Member may progress to the Phase II Actual Portfolio System 14 of the invention and thence to the Phase III BI Funds System 16, both as described in more detail in reference to FIGS. 4 and 5, respectively.

It is an important aspect of the invention to build a large subscriber base, 64 from which a stream of subscriber revenues 66 can be generated. This is shown schematically in the upper right of FIG. 2. The subscriber base is built through the M-Site home pages wherein a suite of Observer and/or Investor services, 68 are offered, some on a free basis and some on a fee-for-service basis. For example, the right to observe and access to post questions or information to certain discussion boards can be offered free, 70, while the tracking during the quarter, even daily of selected BIMs can be offered on an optional fee basis, 72. These subscriber services begin with the initial competition, and subscribers can come aboard at any time. The suite of services can shift and expand as the members move into Phase II, their management of Actual Portfolios. Ultimately, the subscribers/members may elect to invest as shareholders, 74, in one or more of the BI or traditional funds offered in the Phase III Fund Supermarket system. As noted, the initial contact and access of subscribers, 76, to the M-Site is via the Internet, with suitable registration, billing and password controls. Special e-mail accounts, 78, can be set-up, typically on a fee basis for more current, e.g., instant messaging-type communications and monitoring by the subscriber.

Figure 3:
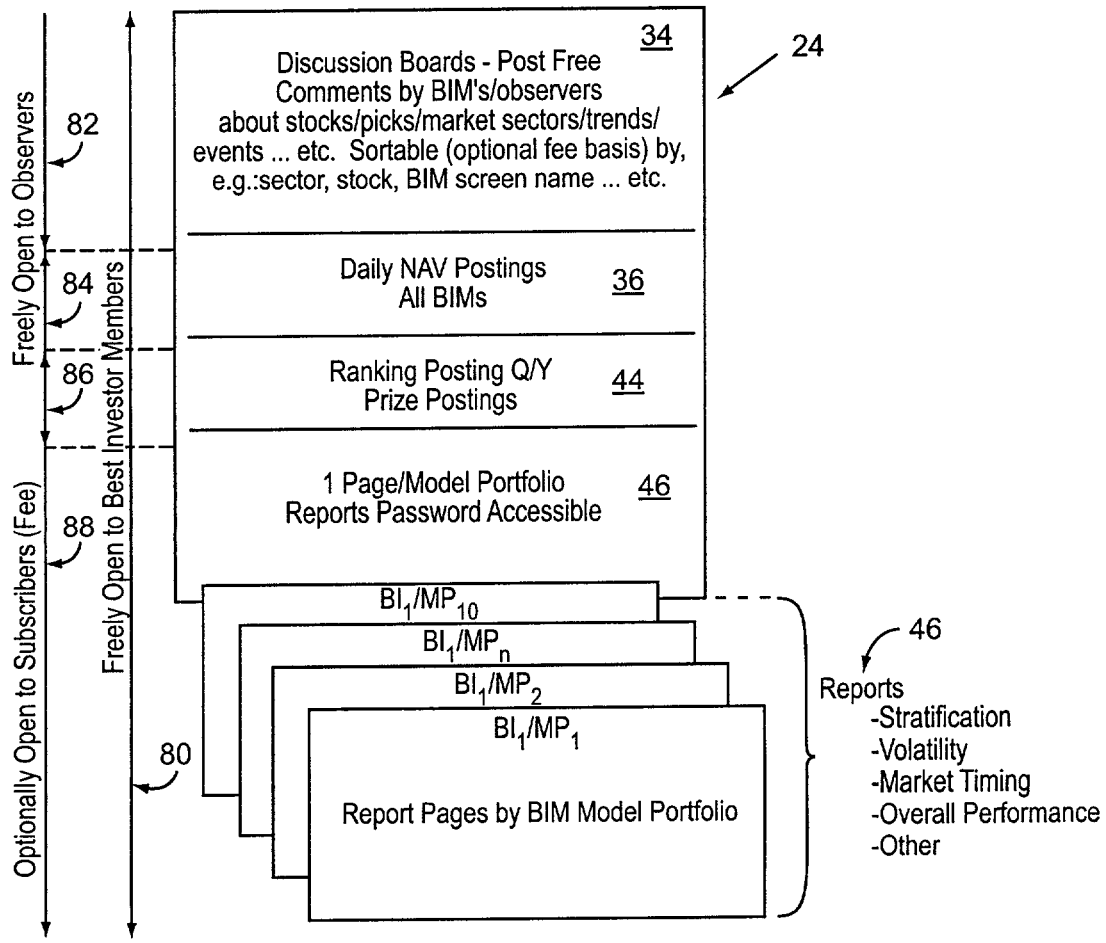
FIG. 3 is a schematic diagram of the site pages portion of the inventive business method and system.

FIG. 3 illustrates typical pages of the M-Site, 24, and the range of access thereto. The observers (typically first time site visitors), subscribers and BIMs click through to the selected page from the greeting home page, going selectively and via controlled access (one or more passwords related to fee based or contestant participation) to discussion boards 34, which are typically posted free and contain comments by BIMs, and subscriber/observers about stocks, picks by the BIMs, market sectors, trends and events in the actual market and business world, etc. The comments are ordinarily posted sequentially by time of posting, but may be sortable on a fee basis, e.g., by sector, stock, BIM screen name, etc. That is, a subscriber, upon paying an appropriate fee, can sort the posting by all comments on a given stock, or a given sector, a particular BIM, or a particular Model Portfolio of a BIM, etc. Another page, 36, contains the daily iTAV/NAV postings for either individual BIM Model Portfolios, or all BIMs, and the like. The rankings page 44 contains the postings of the rankings of BIMs, by BIMs and/or by BIM portfolios (by number) and the like.

In the case of prizes optionally being awarded, the posting page would contain the list of BIs winning prizes. An exemplary prize structure could be $100,000 US $ per quarter for #1 overall, and US $1 MM for the annual #1. The postings page would contain the list of BIs winning prizes.

Another page 46 contains the individual BIM's Reports, 46, which are typically password accessible only. As shown in the lower part of FIG. 3, the report pages are sorted and accessible by BIM Model Portfolio, with each page containing the 4 (or more) reports, Stratification, Volatility, Market Timing and Overall Performance. Thus, BI-1's Model Portfolio-1 is shown on a $1^{st}$ page, MP-2 on a second, and so on. As shown on the left of FIG. 3, typically all those pages are freely open, 80, to BIMs, whole certain of the pages may be open to observers, 82, and others open to subscribers on a fee basis, 88. Thus, the quarterly and yearly final rankings and prize award postings, 86, will typically be free to the observers and subscribers, while the Daily NAV postings, 84, are ordinarily not open to the observers but can be opened to the subscribers on a fee basis.

FIG. 4 shows the Phase II Actual Portfolio aspect of the inventive system, which facilitates transactions for members 50 who elect to engage in construction and trading in an actual portfolio of their own funds, or those of others to which they have direct access by private agreement. This is preferably open to all members, not just BIs. The M-Site 22 offers a full suite of investor services 90, shown schematically in the outlined area, including facilitating the setting up of the member's selection of stocks in a fund, in which the member may elect at his/her option to have the site sponsor/operator set up a hyperlink 92 direct to one or more selected brokers, 94, designated as B-1, B-2, . . . , etc. Or the member may elect to use the brokerage services 96 of the Site, which will have links 98 to Site-selected brokers.

As before, the site is operated and managed through a full suite of computer operations, database management and processing operations 40 which facilitate member transactions. Secure links 104 are enabled to facilitate carrying out the transactions, including the member's direct trade/confirmations 106 with his/her selected brokers 94, and for the brokerage service-to-brokers and mutual funds, 96-94-108 transactions. This figure also shows that in Phase III, the BIM Mutual Funds 100 are linked to the market via the secure links 104 (bottom of the figure), and may have direct link(s) 102 to one or more of the mutual funds 108. For the BIM-to-Site links, a customer (member) ID and password, with an optional (preferred) encryption and digital signature system being employed. For the brokerage services 96 via links 98 and Phase III Mutual Fund transaction via links 102, the secure links 104 enable the trade/order interactive transmittals 112 and confirmations 114 with the brokers 94, and the corresponding trades and redemptions 116 and corresponding confirmations 118.

Compensation flows to the Site sponsor corporation from click-through fees and commission sharing 120, from brokers, and the corresponding basis points selling agreements 112 with the mutual funds 108. As in Phase I, observers/subscribers 64 may continue to follow and receive 124 various reports 110 on the Site services and activity of selected BIMs in their actual portfolio operations, typically on a fee basis, 64, such as daily NAV postings, quarterly and yearly rankings, and others of the optional discussion boards, and the like as described above.

As seen in FIG. 5, as the system matures into Phase III, the BI funds System, the operation of the BIM Model and Actual Portfolios functions as a selection process 130 wherein outstanding BI performers, such as BI-1, -2 . . . -n, 132, 134, 136, are invited by the site manager/operation organization to create one or more "Best Investor Funds" with the selected BIs as fund managers. Upon negotiation and agreement 138*a, b, c*, one or more funds 140*a, b, c*, are created 142, with the BI being retained, under a management agreement with appropriate compensation, by the site operational organization or a subsidiary or affiliate thereof, operating as a registered investment advisor. The BIs provide management decisions 144*a, b, c*, to the appropriate trusts 140*a, b, c*, which typically operate as individual trusts.

It should be understood that the relationships and functions described herein are not meant to be exhaustive of the typical and conventional relationships in fund operation and management, but are outlined herein to illustrate the business method of the invention and the Internet-based system having the designed functionality and capability of full service fund creation and operation. Thus, the site operational company either creates and operates an underwriting/distribution entity, or contracts with existing Underwriters/Distributors 150. Note also that it is an important aspect of the invention that Subscribers and others 64 can participate as shareholders 152 in the family of BI Funds created under the system of the invention, principally through the Site (See FIG. 4), or directly through offerings of the underwriters or broker distributors. As before the Site operations provides communications links for exchange of prospectuses and the subscription agreements 154, handles the share purchases 156, the distributions 158, the reports 160 and the redemptions 162, between the several funds 140*a, b, c* and the shareholders 152. Of course, all internal operations and communications are handled by the computer system and operations 40 as described above.

Important aspects of the invention are the analytic tools and reporting to members, individual investors, subscribers, Best Investors, and Fund Managers. FIGS. 2 and 3 reference important analytic report tools 46, including unique reports on Overall Performance, Stratification, Volatility, Market Timing, Fundamentals, and $G_{S/E}$ Ratio, which function as powerful decision tools for the site members, fund managers and subscribers. The first four of those are illustrated in FIG. 6, and the latter two in FIG. 7.

The wide range of analytics may be offered, free, on a paid basis, or both. In addition to the special analytic tools discussed herein, the analytics provided may present other metrics, including: sector weightings; member's performance by sector and/or industry; comparative performance vs. market or vs. other members; market timing; risk and volatility adjustments; member's overall performance (a reflection on investment style and potential risk); market capitalization (low, medium, high); value, blend, growth; comparative performance vs. common indices (S&P 500, etc.); stratification; member's iTAV/NAV charted vs. S&P 500 Index and the like. The site may also provide as an informational or analytic tool, a summary of the total (all funds) position in a given fund, or a summary of selected member's position, e.g. position in or compared to the m100, or summary of the position of members selected by the inquiring member/visitor, as a guide to the members' degree of confidence in that stock. The position can be accompanied by the average or specific member's NAV of that stock; the average gain; and trade volume, including volume as a relative % of the real market.

Figure 6A:
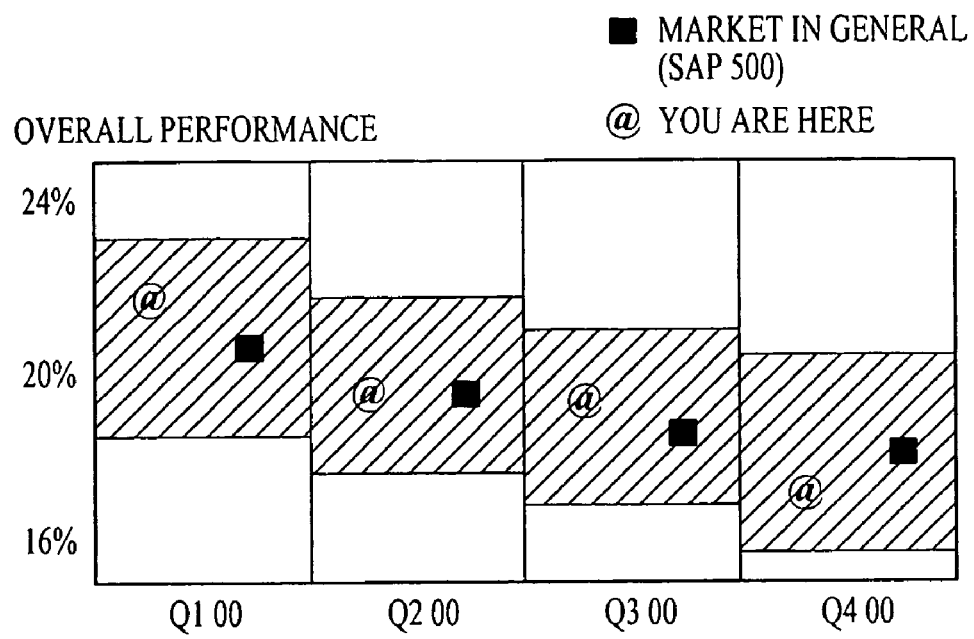
FIG. 6 is a four part figure showing in graphical format four principal reports identified in FIGS. 2 and 3, FIG. 6A showing Overall Performance, FIG. 6B showing Volatility, FIG. 6C showing Performance Stratification, and FIG. 6D showing Market Timing.

FIG. 6A is an Overall Performance Report, in a graphical format, showing the overall performance of the BI portfolio, typically reported in terms of NAV, principally and preferably the personal NAV of the investor members or fund manager candidate members with respect to the particular portfolio, measured as percent change in personal iTAV/NAV per unit value over at least one determined period of time, e.g., 30, 60, 90 days, Quarterly, Yearly, etc. The percent change in NAV values in the selected time period can be ranked, and a preselected top percentage or number are selected as Best Investors based on that metric, such as the top 100, called the m100. While FIG. 6A shows the performance graphically as percentile change vs quarters, it can be represented in any form, including a table or database, and in electronic for as a data structure, or a visual display, and also delivered to the investor/member/manager/subscriber in hardcopy form. Note the graph also shows where the investor's portfolio is vs the S&P 500 performance.

Figure 6B:
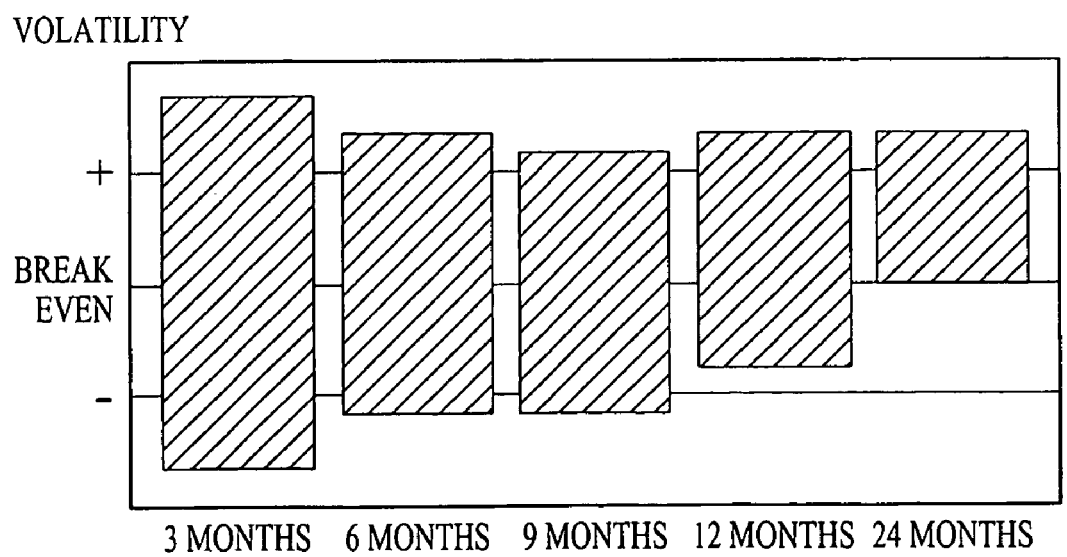

FIG. 6B is a Volatility Report, in graphical format showing the relative and progressive change in volatility of the portfolio, with the shaded bars showing the weighting + or − with respect to the break-even line.

FIG. 6C is a Stratification Report, in the form of a grouped tabular presentation of all the stocks in a particular portfolio, grouped by Top, Mid, and Bottom performers by percentage return, and with one column showing the relative weight in the portfolio, in terms of % of the total market value of the portfolio as of the report date.

FIG. 6D is a Market Timing Report, in the form of a graph, showing the relative performance of the Buys vs the Sells, at the end of three periods, 30, 60 and 90 days, respectively. The curves show that the Buy side was timed well, but the Sell side was not, reflecting errors in market timing of the Sells, and deterioration in the Sell judgment.

The Market Timing charts compare the performance of the stocks bought and sold after the transaction. If the stocks bought increase in value after the buy and those sold decrease the lines diverge and market timing of the portfolio manager (member) is good. If the stocks bought trend down and the sells trend up, the timing is poor. To highlight the trends (convergence, divergence or crossing), the buys and sells are graphed on the same chart, preferably with distinguishing characteristics (line color, different data point, etc.) The chart preferably has a horizontal medial ordinate, the 0% line; the Y axis is the change in iTAV/NAV in % or absolute value of the NAV; and the X axis is time, in days, weeks, months, progressing left to right since the trade (the trade dated need not be identical, although a sale of stock A to buy stock B, can be charted and the charting start point is the same).

One of the most powerful services of the system of the invention, as delivered via the Internet Business Method thereof, is the method for assessing a portfolio of investments or allocation of assets by company fundamentals. This method is illustrated by reference to FIG. 7, a graph of Sales Growth to Earnings Growth. The scope of this disclosure is also intended to cover the reciprocal graph of Earnings Growth vs Sales Growth. While the discussion that follows is in reference, first to an entire company, and then to all the companies in a given portfolio, it should be understood that this comparative growth data is also useful to assess other features or relationships, such as but not limited to: allocation of company resources, including capital, personnel, R&D, etc.; assessment of performance of managers; evaluation of companies as potential merger or acquisition candidates; and evaluation of the performance of funds, including the model and real funds of the member investors, as part of the selection of BIs as fund managers or prospective Marketocracy Fund managers (this is a subset of assessment of the performance of managers listed above).

The steps for this company fundamental assessment method are as follows:

1. Decide on a suitable investment horizon, e.g., a year;

2. For each quarter do the following:
   a. obtain most recent sales and earnings figures;
   b. obtain corresponding sales and earnings figures from an earlier period such that the time between the earlier period and the current period is equal to the investment horizon;
   c. determine (e.g., calculate) the percentage changes in sales and earnings;
   d. plot each company in the portfolio in a two dimensional space defined by sales growth on the vertical axis and earnings growth on the horizontal axis (or the reciprocal);
      1. Optionally, draw a diagonal line between the origin of the chart and the top right corner. This line signifies all points where sales growth equals earnings growth;
   e. Optionally, draw a circle (called a "bubble") around each point such that the area of each circle is proportional to the size of each stock's relative investment in the portfolio;
3. Reading the chart:
   a. It is difficult for companies to grow their sales and become more profitable at the same time. Good management and strong industry and company fundamentals are required to keep a company to the right of the diagonal line over time.
   b. Individuals who wish to make investments in companies with strong company fundamentals should observe that the bulk of the bubbles should cluster in the lower right corner over time.
   c. Big bubbles in the top right corner of the chart should draw the manager's attention to reassess the merits of the investment.

The points on the chart, in the center of the circles, are the x,y coordinates: Sales, Earnings for the particular period for the particular company (or profit center). The points thus represent the performance position of the company on the graph over the investment horizon. The size of the circle represents, e.g., the relative weight of the company stock in the entire portfolio, or in the case of asset allocation, the relative amount of capital tied up in a particular profit center. The inventive method can employ and display the S/E (or E/S) fundamentals in a wide variety of ways (modes and formats):

Points on a graph;

Tabular format or database structure;

Areas on a graph in which the area represents a selected weighting factor, e.g., percentage of total invested in the portfolio, percentage of total company invested capital, percentage of a budget (such as a marketing or R&D budget), legal costs, liabilities, interest, debt, etc.;

A triaxial graph with coordinates x, y, z in which x and y are as above and z is another parameter, such as capital investment, percentage of portfolio, etc;

Dynamic display in which the points move over time or the areas (called bubbles) move or grow/shrink over time. Such dynamic displays can also be three dimensional, such as the triaxial graph described above; and As ratios, e.g. the $G_{S/E}$ Ratio, or its reciprocal (inverse) $G_{E/S}$ Ratio, which can be displayed in tabular format or a part of a database structure.

As to the ratio approach, the term "$G_{S/E}$ Ratio" includes both that ratio and its reciprocal, the $G_{E/S}$ Ratio. Likewise the graph can be inverted, so that the Y axis is the Earnings Growth and the X axis is the Sales Growth. It is presently preferred to express the ratios as $G_{E/S}$ and the graph with Earnings Growth on the Y axis, so that the ratio of a fundamentally sound company is greater than one, and the best performers on a graphical format tend to the upper right above the line (above a slope of 1.0). It should be understood that FIG. 7 only shows a single quadrant, but company performance may be on any one of the other three quadrants, x, y, of: −, +, −, −; and +, −. Of course, performers in these three quadrants are subject to re-evaluation for inclusion in a portfolio. Watching the point or bubble movement over time gives rise to the concept of Critical Drift, where a company point performance approaches or moves close to or over the 1.0 slope line into slower earnings growth than sales growth, which may be an investor trigger point for action, such as sell the stock. Likewise the rate of shrinkage (negative growth in sales or earnings) may be, and typically will be, a critical investment decision point.

Figure 7:
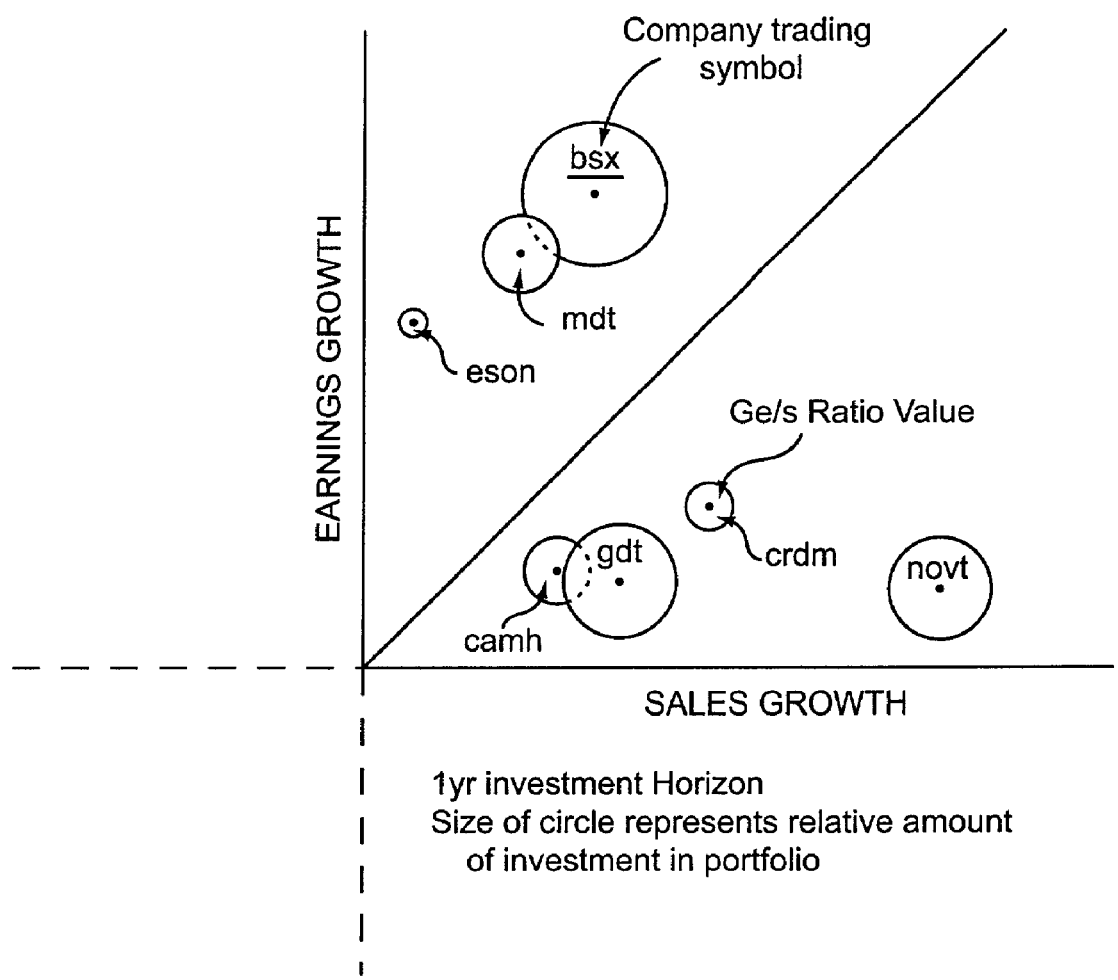
FIG. 7 is a graphical representation of the Sales Growth vs Earnings Growth of a company (or profit center within a company) in accord with the system of the invention for assessing company fundamentals, such as for determining whether or not to include the company's stock in a portfolio, whether or not the company is a good target for merger or acquisition, what the relative allocation of company resources should be to a particular profit center of a company (which could be the entire company), such as allocation of capital resources, personnel, R&D focus, etc, and for evaluating the performance of managers, sales and production personnel.

The graphical analysis technique of FIG. 7 also applies to evaluation of Best Investors. In this case, the Y (vertical) axis is either the absolute iTAV/NAV or the % change in NAV over a given period, while the X (horizontal) axis is time from a particular date of inception. The NAVs can be plotted as points, and the representation can be dynamic, that is, the movement over time can be shown in a streamed video or graphic display. They can be plotted as bubbles, the size (area) representing and being proportional to total assets in the fund. As the funds rise, and pass a preselected horizontal line (or approximately a 45° slope line), e.g., a line representing the performance level of the top 10% BIs or the S&P 500, or the top X % of professional managers, the respective fund managers are selected as BI's and get their own fund (Phase III, described above). Where funds drift right, and perhaps drop to negative territory (below the X-axis), these are under-performers. If they were real fund managers, they are replaced. The fund charts can be particularized by sectors. The chart can employ the horizontal (X) axis as the 0% change line, so that the Y axis extends both above and below that line, the latter being negative territory. This helps visualize fund drift into loss positions, which may not be time to replace managers under certain conditions, such as recession.

By "display" as used herein is meant not only passive or active (dynamic and/or interactive) display on screen (e.g., computer screen), but also hard copy print-outs, and any other display modality now customary or developed in the future. The display may be audio-visual, and flyover by the viewer of any particular point or bubble on the graph with a mouse pointer (or touching the bubble with the finger or other pointing device (stylus, laser pointer, etc) can cause a pop-up link to further details of the company or feature represented by the point, line area or bubble.

A wide variety of additional features, exemplified below, may be added to the site and offered to one or more of site visitors, members, subscribers, fund investors, and Best Investor fund managers and their funds.

Top Performers:

Analysis of the performance of the top performers, e.g., the "Top 100" (also called the m100), preferably including their iTAV/NAV ranking is offered on a periodic basis, e.g., monthly, quarterly, semi-annually, or any other selected period. For example, each quarter, the Top 100 investors are ranked based on the previous quarter's results, and the ranking updated quarterly. The Top 100 performers may also be ranked over shorter or longer periods, e.g., daily, weekly, multiple quarters, yearly and longer term. Statistics are compiled, the rankings generated and then posted, such as: Quarter-ending iTAV/NAV; Daily iTAV/NAV charts, lists or rankings; Quarter-ending ± change in iTAV/NAV compared to prior quarter(s); financial performance factors, such as Portfolio Value, ± changer in Portfolio Value compared to prior quarter(s), dividends received, volume of trades (total; by sector and/or stock; by day, month, or quarter(s); BI volume of trades vs marked; and the like); top buys and sells, for example in terms of volume and performance; market timing performance; $G_{S/E}$ Ratio or $G_{E/S}$ Ratio of the stocks or the fund(s) as a whole; and the like.

Such comparison of the BI member's performance vs. professional fund managers is a measure of their expertise, and can be analyzed and/or expressed in a variety of ways. In one embodiment, the m100 is a list of the top 100 members based on % change in NAV over a given period (e.g. Quarterly, half year, yearly). The average % gain or loss of the 100 best member performers' funds forms an index, the "m100 Index," which can be tracked like, and compared to, the S&P 500 (or other recognized financial indices), and can be compared to performance of professional fund managers. The top 100 funds may involve fewer than 100 managers. The analytics on the m100 fund performance can also include volume, buy/sell summaries, and commentator analysis.

The metrics reports and rankings may include holdings of the top 100 (or the entire) membership) reported in one or more ways: by market capitalization sectors; by industry sectors; numbers of shares held in top 10, 50, 500 identified companies, both as to long and short positions; and comparison of the m100 to the actual market.

The m100, in addition to being the list or collection of top 100 funds/Best Investors, can also be a fund itself. The m100 Fund portfolio may include, but need not be limited to, the consensus of the top 10-100 financial instrument holdings (e.g., stocks) of the top 100 funds, or the funds of the m100 members.

The Site sets up a set of guidelines and restrictions for portfolios and funds to be eligible for (qualify for) ranking as a Best Investor and in the top 100 investors (the m100). When a member's fund is out of compliance, the member will be notified, e.g. upon $1^{st}$ selecting stocks/bonds for fund portfolio; and upon trades, balancing portfolio, or other activity. The notification can be any one or more type of text or icon message e.g. stop activity sign, error message, or the like. Requirements for fund compliance may include, for example:

At least 10 stocks in the fund;
A maximum of 25% fund assets in one stock;
Preselected minimum market capitalization per stock;
Preselected minimum market price for each stock;
For a sector fund, a minimum amount of assets in the particular sector;
Correspondingly, for diversified fund, a maximum amount in any one sector;
Dividends are added to cash position; splits go to stock position; and
Rebalancing and resectoring (change to different sector) permitted, and the like.

Some or all of the top 100/m100 data can be offered free to visitors, or selected information can be offered to members or subscribers on a fee basis. Likewise, the fee basis can be time sensitive or time dependent, that is, earlier availability of the information may carry a fee that is reduced over time to zero. For example, daily or weekly performance analysis and statistics may be offered on a fee basis, whereas quarterly Top 100 /m100 performance statistics may be posted on site or web page free to visitors. Monetary and/or recognition awards may be given to the Top Performers, such as: exclusive "Marketocracy Top 100" or "Marketocracy m100 Member" business cards, having their fund name and ranking; exclusive access to special site features; prizes; special recognition; publicity, and the like.

Top Performers Private Discussion Groups:
This feature comprises a private discussion forum, enabled via e-mail, password-accessed bulletin board or chat room, in which the Top Performers as designated by the site management, e.g., the Marketocracy Top 100, have an opportunity to discuss and exchange investment ideas, and to communicate with Marketocracy Funds portfolio managers.

Fund Barometer(s):
This feature may be configured in a number of embodiments. In a first embodiment, the fund barometer comprises a template, page or the like on which site visitors, members and nonmembers alike input a list of investments (e.g., stocks) which comprise one or more proposed portfolio(s), and the return on each portfolio is automatically calculated for the prior quarter(s). The return on each is then compared to the results of professional fund managers, and a line graph or other form of comparison is created and displayed which shows what percent or number of professional money managers they would have beat, had their portfolio been real with those returns. In a second embodiment, the site visitor enters the actual or estimated return on their own non-Marketocracy site portfolio, which they either manage themselves or have managed by others. That return is compared to professional managers and the line graph shows them what number or percent of professional fund managers their portfolio return has or would have beaten.

This feature provides the inventive system with an excellent recruitment device, as those with good returns will be encouraged to sign up and start their own model or real fund, as the case may be. Those with lesser returns will be encouraged to subscribe to the site services, such as education and training, including an opportunity to look over the shoulders of the best investors in the world.

Mentor Services:
In this feature, a member is permitted to subscribe, for a fee, to other top performing members. The subscription includes, typically by e-mail, cell phone, pager, fax, or the like, updates when trades (of the subscribed-to member) occur, the rationale for the trade(s), daily or weekly updates on the top performing members' portfolios performance, and the like. The subscription fee revenue may be shared between the subscribed members and the site, which functions as the BIlling and collection agent.

Investment Idea Forums—Ranking Sortable:
This feature comprises one or more bulletin boards, forums, chat rooms or the like where members post their investment ideas. The boards are sortable by performance ranking of the person posting, including "unranked" for new members, thus permitting evaluation of the ideas and comments. Other sort criteria are also offered, such as by date/time of posting, by sector or stock, by posting person, and the like. In addition, the postings can include links to the company mentioned, or to news articles, financial charts or publicity releases of the mentioned company.

Private Portfolio Tracking:
Members who have real portfolios can have their real "outside" portfolios tracked in the same manner as a virtual portfolio. The tools and reports are the same as described above. The member enters their trades (stock, date, price) rather than having the site fill orders. These portfolios are private, and typically not subject to ranking, although in one alternative, a comparative ranking can be requested. This feature can be on a fee or free basis.

It should be understood that the data entry for a variety of features described in this application can be archival, that is, the date of a trade or the start of a virtual portfolio can be a date earlier than the data entry date, so that the historic performance of an actual trade is accurate, and of a virtual portfolio is on a "what if started" on a particular earlier date. In addition, in features where the member enters in a prior trade price and date, an automatic checking feature can flag, e.g., by redlining or highlighting, an erroneous entry. Thus, for example if CocaCola stock purchase is entered erroneously as "$1.05," instead of "$105," the program of the site, by comparison with the history of the stock prices throughout its existence, can flag the entry in red, or query the member, "Did you buy the stock in 1921" and the like.

INDUSTRIAL APPLICABILITY

It is evident that the invention has valuable industrial applicability to the financial industry in offering better access, feedback, ranked advice, credibility and best performance managed funds to millions of individual investor members.

It should be understood that various modifications within the scope of this invention can be made by one of ordinary skill in the art without departing from the spirit thereof. We therefore wish this invention to be defined by the scope of the appended claims as broadly as the prior art will permit, and in view of the specification if need be, including equivalents thereof.

The invention claimed is:

1. A method of measuring and ranking investment management performance of individual investors amongst a large universe of investors in order to create investment products for other persons as customers to invest in, comprising the steps of:
   a) in a first phase, creating at least one personal portfolio comprising at least one financial instrument for each said individual investor participating in said performance ranking method, said universe of investors comprising on the order of greater than 1000 persons;
   b) assigning to each of said individual investor personal portfolios a preselected financial value as at least one of a personal portfolio investor Total Account Value and a Net Asset Value at a defined starting point in time;
   c) permitting said individual investors to personally select and individually trade said at least one financial instrument in each said personal portfolio through a trusted independent $3^{rd}$ party, said trades affecting said at least one investor Total Account Value and said Net Asset Value, and wherein
      i) said trusted third party is at least one of: i) a registered investment advisor, and ii) a registered broker/dealer; and
      ii) in at least a second phase, at least some of said participating individual investor's trades are real trades reported to said trusted $3^{rd}$ party as executed;
   d) tracking said personal portfolio of at least one investor Total Account Value and said Net Asset Value of each said investor by the trusted $3^{rd}$ party;
   e) said trusted $3^{rd}$ party periodically ranking the performance of at least some of said investor's personal portfolios by a computer-enabled system based on change in at least one of an investor Total Account Value and a Net Asset Value over a determined period of time as a metric for credibly determining individual best investors from among the universe of participating investors; and
   f) in a third phase, selecting at least one of the individual best investors, whose personal portfolios and real trades have been measured and ranked over time by a computer-enabled system, as a candidate professional fund manager to select financial instruments for inclusion in an investment product to be offered to other persons as customers as an investment opportunity.

2. A method as in claim 1 which includes the added step of said trusted $3^{rd}$ party periodically reporting to at least one of said participating investors and potential investment product customers, said performance ranking of at least selected participating investors' personal portfolios.

3. A method as in claim 1 wherein said individual investor performance is based on percent change in personal investor Total Account Value or Net Asset Value per unit over at least one determined period of time of at least 30, 60 and 90 days.

4. A method as in claim 3 wherein said individual investor performance is ranked against at least one of: a) a market, and b) other individual investors.

5. A method as in claim 4 wherein the financial instruments are selected from a pre-determined set of financial instruments.

6. A method as in claim 1 wherein said personal portfolio is a model portfolio.

7. A method as in claim 6 wherein said trades are virtual trades carried out by said trusted $3^{rd}$ party in a simulated market managed by said trusted $3^{rd}$ party.

8. A method as in claim 7 wherein said simulated market is a rules-based market.

9. A method as in claim 8 wherein:
   a) said virtual trades mirror trades of corresponding real financial instruments; and
   b) said trusted third party executes said virtual trades in said virtual market at values corresponding to trades of corresponding real financial instruments reported for times substantially corresponding to the virtual trade request by said individual investor.

10. A method as in claim 9 wherein said trusted third party reports said trades to said participating individual investors by electronic communication.

11. A method as in claim 10 wherein said communication is effected via the Internet in order to enable near real-time operation.

12. A method as in claim 11 which includes providing said participating individual investors with at least one virtual portfolio analytic report.

13. A method as in claim 12 wherein said at least one report is a report on portfolio stratification, volatility, market timing, and company $G_{S/E}$ or $G_{E/S}$ Ratio performance.

14. A method as in claim 13 wherein said volatility report includes individual investor portfolio ranking against at least one of: a) at least one of a real and a virtual market, and b) other individual investors.

15. A method as in claim 11 wherein information on at least one of said individual investor virtual portfolios is made available to other persons on at least one of:
   a) free, and b) a paid subscriber basis.

16. A method as in claim 11 wherein information comprising ranking of individual in-vestor performance is posted on a web site, and said web site includes at least one bulletin board on which individual investors may make postings regarding the market.

17. A method as in claim 16 wherein said bulletin board postings are sortable by at least one of: a) author, b) the ranking of the author's individual investor portfolios, c) identified financial instruments, and d) market sectors.

18. A method as in claim 17 wherein, on a paid subscription basis, subscribers may access at least one of model portfolio virtual trades and bulletin board postings of participating individual investors.

19. A method as in claim 8 wherein said participating individual investors may compete against other participating investors for ranking based on individual investor performance based on percent change in at least one of personal investor Total Account Value and Net Asset Value over at least one determined period of time.

20. A method as in claim 19 wherein said participating individual investor may compete for ranking base on a plurality of model portfolios.

21. A method as in claim 20 wherein said rankings determine best investors in at least one of: a) a predetermined time period, b) a series of time periods, c) market sectors, and d) overall performance.

22. A method as in claim 19 wherein information on said competition is made available to other persons on at least one of: a) free, and b) a paid subscriber basis.

23. A method as in claim 22 wherein information comprising the ranking of individual investor performance in said competition is posted on a web site, and said web site includes at least one bulletin board on which participating individual investors may make postings on at least one of: a) the market; b) virtual trades by an individual investor, c) the competition; and d) the rankings.

24. A method as in claim 23 wherein said bulletin board postings are sortable by at least one of: a) author, b) the ranking of the author's individual investor portfolios, c) identified financial instruments, and d) market sectors.

25. A method as in claim 23 wherein, on a paid subscription basis, subscribers may access at least one of model portfolio trades and bulletin board postings of participating individual investors.

26. A method as in claim 6 wherein said participating individual investor performance rankings are used to select at least one manager for real portfolios.

27. A method as in claim 26 wherein a registered investment company is formed for trading shares in a fund comprising real financial instruments managed by said selected manager.

28. A method as in claim 27 which includes providing said participating individual investors with at least one portfolio analytic report, and wherein said reports assist participating individual investors to determine their relative strengths in and among various investment sectors in order to focus their stock selection for a real portfolio.

29. A method as in claim 28 wherein said trusted third party provides a mutual fund supermarket in which said individual investors and customers can trade in funds providing the opportunity for improved overall investment performance.

30. A method as in claim 29 wherein said mutual funds pay a distribution fee to said trusted third party.

31. A method as in claim 28 wherein said trusted third party provides access to other stock brokerage firms for trading stocks, the performance of which are deemed acceptable to said individual investors and customers.

32. A method as in claim 31 wherein said brokerage firms pay said trusted third party at least one of: a) click through fees and b) share of commission fees.

33. A method as in claim 1 wherein said step of tracking by said trusted $3^{rd}$ party comprises processing said trades and calculating said at least one personal investor Total Account Value and Net Asset Value on a regular basis.

34. A method as in claim 33 which includes electronic communications between said participating individual investor and said trusted $3^{rd}$ party.

35. A method as in claim 34 wherein said communication is effected via the Internet in order to enable near real-time operation.

36. A method as in claim 35 which includes providing said participating individual investors with at least one portfolio analytic report.

37. A method as in claim 36 wherein said at least one report is a report on portfolio stratification, volatility, market timing and company $G_{S/E}$ or $G_{E/S}$ Ratio performance.

38. A method as in claim 37 wherein said volatility report includes individual investor portfolio ranking against at least one of: a) a market, and b) other individual investors.

39. A method as in claim 1 wherein information on at least one of said portfolios is made available to other persons on at least one of: a) free, and b) a paid subscriber basis.

40. A method as in claim 39 wherein information comprising ranking of individual investor performance is posted on a web site, and said web site includes at least one bulletin board on which individual investors may make postings regarding the market.

41. A method as in claim 40 wherein said bulletin board postings are sortable by at least one of: a) author, b) the ranking of the author's individual investor portfolios, c) identified financial instruments, and d) market sectors.

42. A method as in claim 39 wherein, on a paid subscription basis, subscribers may access at least one of model portfolio trades and bulletin board postings of participating individual investors.

43. A method as in claim 1 wherein step c) includes, in advance of said individual investor making real trades through said trusted independent $3^{rd}$ party, the steps of:
  a) offering to site visitors a skill-based evaluation involving managing over a preselected time period at least one rules-based virtual investment portfolio comprising at least one virtual financial instrument;
    i) said virtual financial instruments are selected to mirror corresponding real instruments available in at least one real financial market;
  b) qualifying site visitors who apply for virtual investor portfolios as member investors and assigning at least one unique virtual portfolio identifier to each member portfolio;
  c) operating said evaluation amongst a plurality of members, including;
    i) permitting said member to trade virtual financial instruments of said member's virtual portfolio through said site;
    ii) tracking the performance of said virtual portfolio as an analog of the performance of the corresponding real instruments in said virtual portfolio in said at least one real market; and
    iii) reporting to individual members the performance of each of said member's portfolios as its investor Total Account Value or Net Asset Value at preselected time intervals;
  d) posting results representing the performance of each of said member's portfolios in said interval on at least one of a web page accessible by said member and e-mail to said member;
  e) periodically posting the comparative results of the performance of a plurality of member's portfolios on said site for viewing by others, including at least one of visitors and members; and
  f) thereby building a visitor base for a financial services Internet site.

44. Method as in claim 43 wherein said investor Total Account Value or Net Asset Value is assigned on a per unit value basis.

45. Method as in claim 44 wherein said individual investor performance is based on percent change in Net Asset Value per unit value over said selected time interval.

46. Method as in claim 44 wherein said investor Total Account Value or Net Asset Value is reported daily for each day said real financial market is open.

47. Method as in claim 43 which includes:
a) offering at least one message board on said site for postings by at least one of said members and visitors;
b) enabling said postings to be selectively sorted for viewing.

48. Method as in claim 47 wherein said postings include at least one relative performance ranking of selected identified members, and said selective sorting permits sorting by at least one of member and member ranking.

49. Method as in claim 47 which includes the steps of:
a) enabling members to subscribe to information relating to the performance of at least one of the portfolios of at least one selected other member, said subscription being selected from at least one of free, fee-based and a combination of free and fee-based access to said information.

50. Method as in claim 49 wherein said subscribers are permitted to choose what member-related information is made accessible to the subscriber based on the ranking of the member.

51. Method as in claim 50 wherein said subscriber accessible information includes information relating to at least one of trades and postings of the member who has been subscribed-to.

52. Method as in claim 47 which includes the steps of:
a) listing at least one relative performance ranking of at least selected investments of each member author in association with at least one identifier of said author;
b) enabling members to selectively sort through the posting by at least one of author and author ranking;
c) permitting message posting by only a preselected number of members, as determined by their performance ranking; and
d) thereby improving the signal to noise ratio in an investment-oriented Internet discussion board on which message author members post messages related to investments and/or a market.

53. Method as in claim 43 which includes providing said member with at least one portfolio analytic report.

54. Method as in claim 53 wherein said at least one report is a report on portfolio stratification, volatility, market timing, and company $G_{S/E}$ or $G_{E/S}$ Ratio performance.

55. A method as in claim 1 wherein step f) includes the steps of:
a) allocating to a plurality of candidate investment managers a preselected sum of funds for investment;
b) arranging for each candidate manager to invest up to the entire sum of allocated funds in at least one portfolio of at least one financial instrument selected by said candidate from among a preselected group of financial instruments, and determining a personal investor Total Account Value or Net Asset Value for shares of each of said portfolios;
c) carrying out trades of said instruments as directed by said candidate;
d) determining a fractional change in investor Total Account Value or Net Asset Value for shares in each portfolio at preselected intervals;
e) determining the ranking of performance among the portfolios based on the fractional change in investor Total Account Value or Net Asset Value for a preselected period; and
f) identifying at least one of the candidates as a best investment manager who has managed at least one portfolio which has achieved a preselected level of positive increase in investor Total Account Value or Net Asset Value in the preselected period.

56. A method as in claim 55, wherein at least some of the communications relating to the steps are carried out electronically.

57. A method as in claim 56, wherein the communications are enabled via the World Wide Web.

58. A method as in claim 57 wherein the communications are enabled via the Internet and e-mail.

59. Method as in claim 58 which includes:
a) offering at least one message board on an Internet site for postings by at least one of said candidate managers and site visitors;
b) facilitating the selective sorting of said postings for viewing.

60. Method as in claim 59 wherein said postings include at least one relative performance ranking of selected identified candidate managers, and said selective sorting permits sorting by at least one of candidate manager and candidate manager ranking.

61. Method as in claim 59 which includes the steps of:
a) enabling at least one of site visitors and candidate managers to subscribe to access to information relating to the performance of at least one of the portfolios of at least one selected other candidate manager, said subscription being selected from at least one of free, fee-based and a combination of free and fee-based access to said information.

62. Method as in claim 61 wherein said subscribers are permitted to choose what candidate manager-related information is made accessible to the subscriber based on the performance of the candidate manager.

63. Method as in claim 62 wherein said subscriber-accessible information includes information relating to at least one of trades and postings of the candidate manager who has been subscribed-to.

64. Method as in claim 59 which includes providing at least one of said candidate manager and said site visitor with at least one portfolio analytic report.

65. Method as in claim 64 wherein said at least one report is a report on portfolio stratification, volatility, market timing, and company $G_{S/E}$ or $G_{E/S}$ Ratio performance.

66. A method as in claim 55 wherein the funds are virtual, the portfolio instruments are virtual analogs of real instruments, said trades are virtual trades which mirror the real market in said real instruments, and said trading period comprises at least a first round of performance evaluation.

67. A method as in claim 66 wherein:
each candidate manager that has at least one portfolio having a positive fractional change in Net Asset Value for at least one of said selected periods that is larger than a preselected qualifying value is permitted to select a second sum of funds for further investment for a preselected number of rounds before determining the best investors from among the manager candidates.

68. A method as in claim 67 wherein the funds are real money, the instruments are shares in real instruments, and the trades are carried out in the real market.

69. Method as in claim 55 wherein said candidate manager performance is based on percent change in Net Asset Value per unit value over said selected time interval.

70. Method as in claim 69 wherein said Net Asset Value is reported daily for each day said real financial market is open.

71. Method as in claim 1 wherein step e) ranking by said trusted $3^{rd}$ party includes the steps of:
   a) selecting an investment horizon;
   b) listing security returns over selected investment horizon by security;
   c) sorting portfolio by the returns generated by each security over the investment horizon;
   d) dividing portfolio securities into at least 3 groups by performance;
   e) looking for similarities among the investments in the top and bottom groups;
   f) focusing future stock picking efforts on the kinds of stocks in the top group; and
   g) de-emphasizing the kinds of stocks in the bottom group.

72. Method as in claim 1 wherein at least one of steps c) trading and step e) ranking, by said trusted $3^{rd}$ party, includes the steps of:
   a) separating said security trades into buys and sells;
   b) performing on all the buys the analysis of:
      i) comparing the trade price of each security at the trade date with the price of said security at a pre-selected later time;
      ii) calculating the average price change for a pre-determined time period defined as the time between said trade date and said pre-selected later time;
   c) repeating step b) for all sells;
   d) comparing the average price change of the buys to the average price change of the sells;
   e) determining if trading over said pre-determined time period has improved portfolio return based on whether or not the buys average price change exceeds the sells average price change; and
   f) whereby a determination is made whether frequent trades of marketable securities comprising a portfolio are helping portfolio performance.

73. Method as in claim 72 wherein said predetermined time period is at least one of 30, 60 and 90 days.

74. Method as in claim 72 wherein said data from steps b) and c) are presented in graphical format.

75. Method as in claim 74 wherein said graphical format is selected from electronic data structure, a visual electronic presentation, and a hardcopy presentation.

76. Method as in claim 1 wherein step f) includes the steps of:
   a) creating a plurality of investment portfolios for at least some individual investor members of an Internet site, said portfolios being selected from model portfolios and real portfolios;
   b) managing individual investor member trades in said portfolios through a trusted independent $3^{rd}$ party;
   c) analyzing the performance of said portfolios over pre-selected time periods by said trusted $3^{rd}$ party;
   e) periodically posting by said trusted $3^{rd}$ party performance information on a member-accessible page of said site relating to at least some of said portfolios;
   f) selectively enabling site members to subscribe to access to said performance information of at least some of the portfolios of other site members; and
   g) selectively permitting members to choose which member portfolio performance information they can subscribe-to.

77. Method as in claim 76 wherein said posting includes electronic infor-mation relating to trades in the member portfolios and postings of the subscribed-to members, and said subscriber access includes selective sorting of the information based on subscriber choice from among a menu of at least one of sort modes and information types.

78. Method as in claim 77 wherein said subscriber access to information is fee based, and subscription fee revenue is shared with the subscribed members whose information is selected by said subscribers.

79. Method as in claim 77 wherein said information includes analytic reports on at least one of portfolios and individual company stock.

80. Method as in claim 79 wherein said analytic reports are selected from at least one of portfolio stratification, volatility, market timing, and company $G_{S/E}$ Ratio performance.

81. Method as in claim 80 which includes delivering selected information to at least one of said subscribed members and said subscribers in at least one mode selected from electronic data structure, visual electronic presentation, and hardcopy.

82. A method as in claim 1 which includes providing to at least some of said participating individual investors communication or reporting features selected from at least one of:
   a) an overall performance report;
   b) a volatility report;
   c) a stratification report;
   d) a market timing report;
   e) a $G_{S/E}$ or $G_{E/S}$ Ratio in table, chart or graphical format;
   f) an analysis of top investment performers of the participating individual investors;
   g) a private discussion forum for exchange of investment ideas;
   h) a barometer report on at least one fund developed by identified participating individual investors who have been ranked as best investors;
   i) reports on trades by top performing participating individual investors;
   j) ranking-sortable investment ideas forum or bulletin boards;
   k) investor-sortable investment ideas or comments forum or bulletin boards;
   l) private portfolio tracking; and
   m) a fundamentals analysis.

* * * * *